US011920675B2

(12) United States Patent
Zerlaut et al.

(10) Patent No.: US 11,920,675 B2
(45) Date of Patent: Mar. 5, 2024

(54) METHOD AND CONTROL UNIT FOR DETERMINING THE TRAVEL RANGE BETWEEN TWO GEAR SHIFT ELEMENT HALVES OF AN INTERLOCKING GEAR SHIFT ELEMENT

(71) Applicant: ZF Friedrichshafen AG, Friedrichshafen (DE)

(72) Inventors: Daniel Zerlaut, Tettnang (DE); Martina Jehle, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 449 days.

(21) Appl. No.: 17/299,071

(22) PCT Filed: Nov. 5, 2019

(86) PCT No.: PCT/EP2019/080143
§ 371 (c)(1),
(2) Date: Jun. 2, 2021

(87) PCT Pub. No.: WO2020/114693
PCT Pub. Date: Jun. 11, 2020

(65) Prior Publication Data
US 2022/0065347 A1    Mar. 3, 2022

(30) Foreign Application Priority Data
Dec. 3, 2018 (DE) ............... 10 2018 220 869.7

(51) Int. Cl.
*F16H 61/12*  (2010.01)
*F16H 59/68*  (2006.01)
(Continued)

(52) U.S. Cl.
CPC ..... *F16H 61/12* (2013.01); *F16H 2059/6807* (2013.01); *F16H 2059/6823* (2013.01);
(Continued)

(58) Field of Classification Search
CPC .. F16H 61/12; F16H 2061/1272; F16H 61/04; F16H 2061/047; F16H 2061/2823;
(Continued)

(56) References Cited

U.S. PATENT DOCUMENTS 5,099,711 A * 3/1992 Langbo ............... F16H 61/0403
74/335
5,899,829 A  5/1999 Salecker et al.
(Continued)

FOREIGN PATENT DOCUMENTS

DE    19709419 A1    10/1997
DE   102005002337 A1   8/2006
(Continued)

OTHER PUBLICATIONS

International Search Report (English Translation) PCT/EP2019/080143, dated Jan. 17, 2020. (2 pages).
(Continued)

*Primary Examiner* — Roger L Pang
(74) *Attorney, Agent, or Firm* — Dority & Manning, P.A

(57) ABSTRACT

A method for determining an actuating-travel range between two shift-element halves of a form-locking shift element (A, F) during an engagement of the shift element (A, F) and in the presence of a tooth-on-tooth position between the two shift-element halves is provided. An actuating movement of the at least one movable shift-element half with respect to the other shift-element half is monitored by a sensor. A tooth-on-tooth position is detected when it is determined, by the sensor, within an actuating-travel range of the at least one movable shift-element half between a disengaged condition and an engaged condition of the shift element, that the actuating movement of the movable shift-element half in the engagement direction is zero. A ratio between an engagement force applied at the shift element and a radial force (Continued)

acting on the shift-element halves is within a value range, which facilitates a tooth-on-tooth position and an actuating movement of the shift-element half in the engagement direction is detected by the sensor after the reduction of the engagement force and/or after an increase of the applied torque.

15 Claims, 9 Drawing Sheets

(51) Int. Cl.
    *F16H 61/04*     (2006.01)
    *F16H 61/28*     (2006.01)

(52) U.S. Cl.
    CPC ............... *F16H 2061/047* (2013.01); *F16H 2061/1272* (2013.01); *F16H 2061/2823* (2013.01)

(58) Field of Classification Search
    CPC .... F16H 2059/6807; F16H 2059/6823; B60W 10/10; B60W 30/19
    USPC ................................................ 701/51, 58, 67
    See application file for complete search history.

(56) References Cited

U.S. PATENT DOCUMENTS

| | | | |
|---|---|---|---|
| 6,358,183 B1* | 3/2002 | Hughes | F16H 61/702 477/111 |
| 7,789,792 B2 | 9/2010 | Kamm et al. | |
| 8,483,918 B2 | 7/2013 | Arnold et al. | |
| 8,647,237 B2 | 2/2014 | Prix et al. | |
| 9,625,032 B2 | 4/2017 | Maurer et al. | |
| 2009/0000410 A1 | 1/2009 | Guggolz et al. | |
| 2011/0009229 A1 | 1/2011 | Bauknecht et al. | |
| 2011/0166759 A1 | 7/2011 | Bartels et al. | |
| 2014/0291102 A1 | 10/2014 | Iwasaki et al. | |
| 2016/0040779 A1* | 2/2016 | Vespasien | F16H 61/0403 74/339 |
| 2017/0305430 A1* | 10/2017 | Kuzuhara | F16H 61/04 |

FOREIGN PATENT DOCUMENTS

| | | |
|---|---|---|
| DE | 102005054767 A1 | 5/2007 |
| DE | 102008000429 A1 | 9/2009 |
| DE | 102009002205 A1 | 10/2010 |
| DE | 102011010616 A1 | 1/2012 |
| DE | 102013222381 A1 | 5/2015 |
| EP | 2784356 A1 | 10/2014 |
| WO | WO 2010/034400 A1 | 4/2010 |

OTHER PUBLICATIONS

German Search Report 102018220869.7, dated Sep. 13, 2019. (14 pages).

* cited by examiner

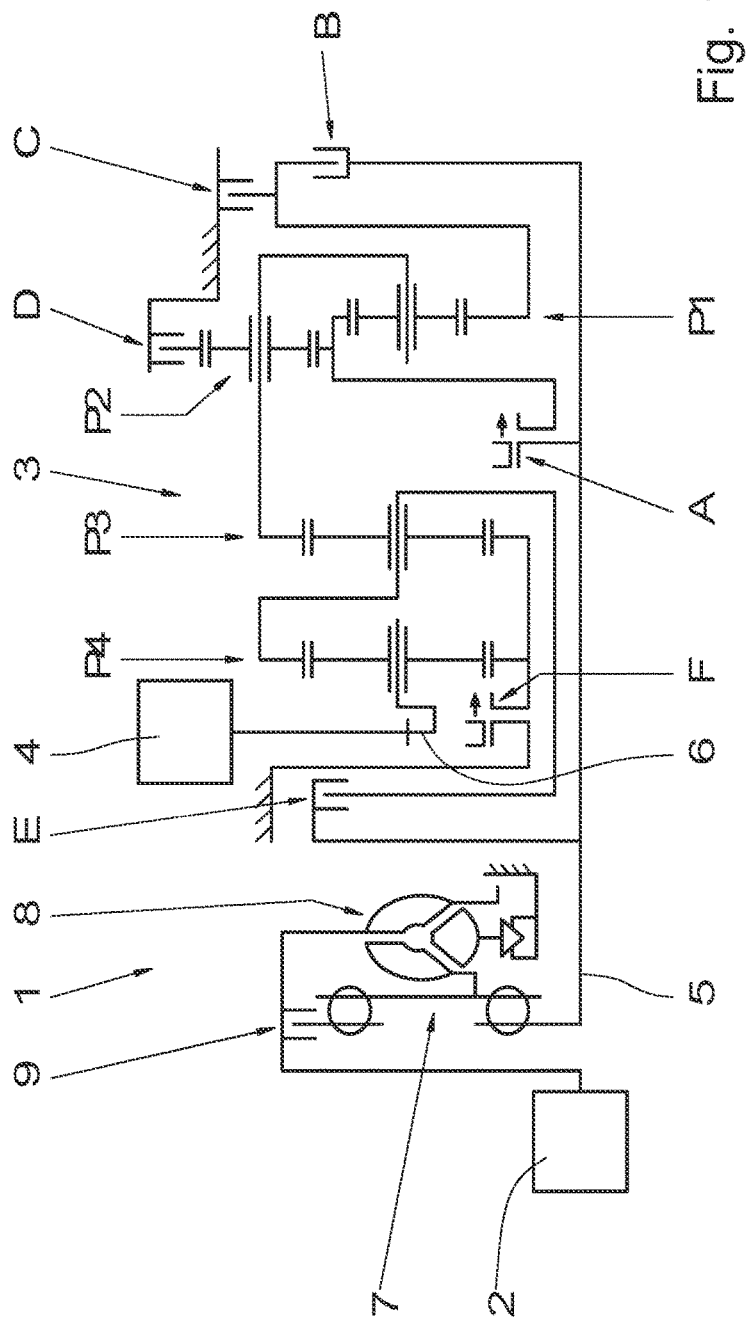

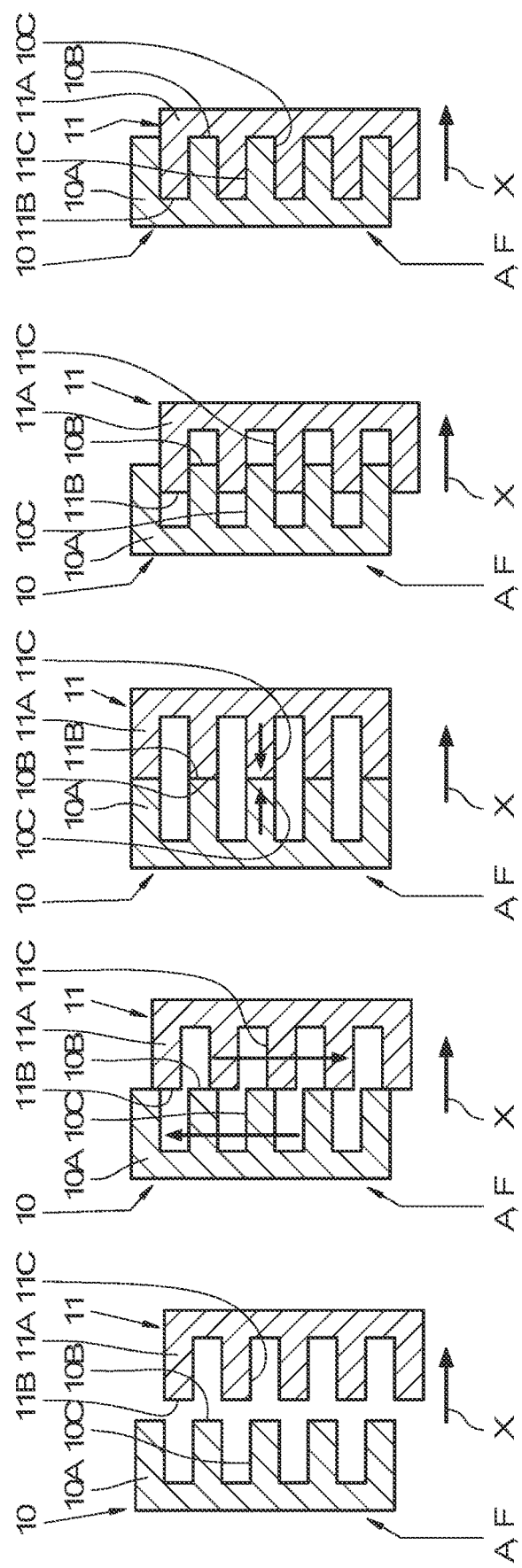

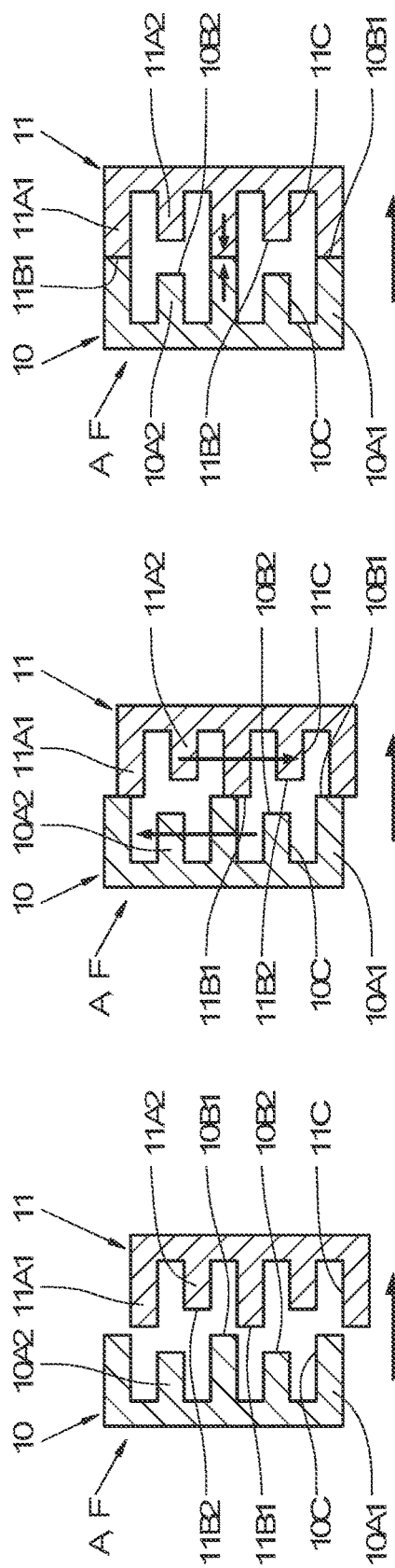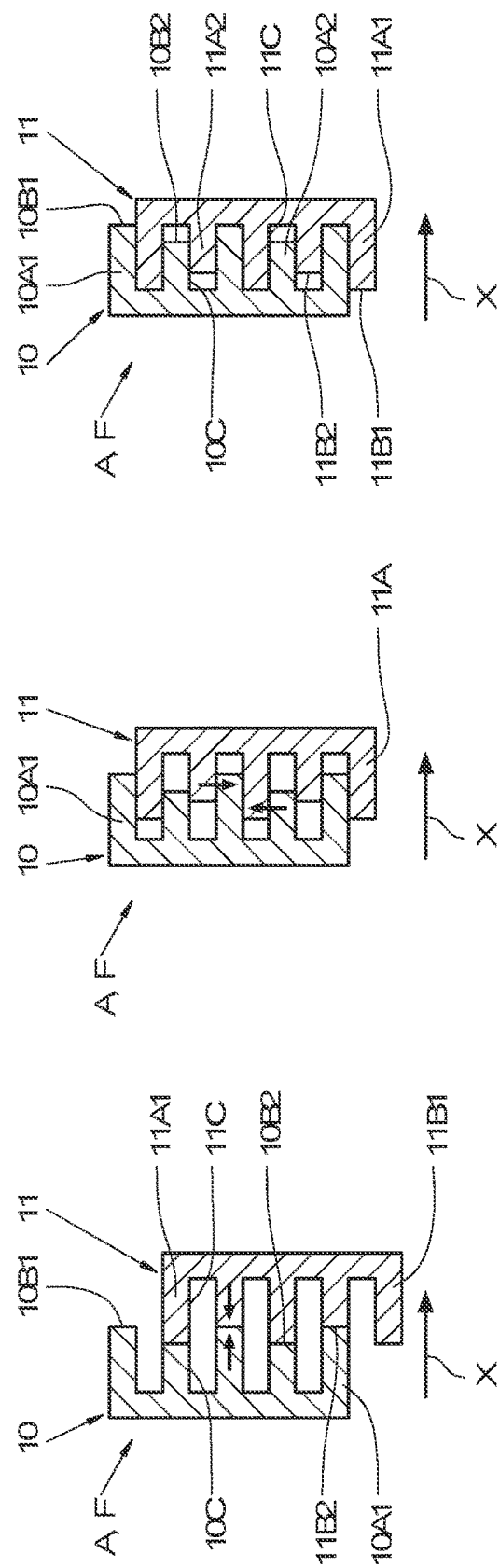

METHOD AND CONTROL UNIT FOR DETERMINING THE TRAVEL RANGE BETWEEN TWO GEAR SHIFT ELEMENT HALVES OF AN INTERLOCKING GEAR SHIFT ELEMENT

CROSS-REFERENCE TO RELATED APPLICATIONS

The present application is related and has right of priority to German Patent Application No. 102018220869.7 filed in the German Patent Office on Dec. 3, 2018 and is a nationalization of PCT/EP2019/080143 filed in the European Patent Office on Nov. 5, 2019, both of which are incorporated by reference in their entirety for all purposes.

FIELD OF THE INVENTION

The invention relates to a generally method for determining an actuating-travel range between two shift-element halves. Moreover, the invention relates generally to a control unit for carrying out the method and to a corresponding computer program product.

BACKGROUND

DE 10 2005 002 337 A1 describes a transmission designed as an eight-speed multi-stage transmission having friction-locking shift elements. The shift elements are designed as multi-disk clutches or multi-disk brakes. In the presence of a shift request for a ratio change in the transmission, at least one of the friction-locking shift elements is to be disengaged from the power flow of the transmission device and at least one further friction-locking shift element is to be engaged into the power flow of the transmission device, in order to transmit a torque.

In general, in the presence of a demand to disengage a friction-locking shift element, regardless of the torque presently transmitted via the friction-locking shift element, it can be assumed that the friction-locking shift element is actually transitioning into the disengaged operating condition. To the same extent, a demand to engage a friction-locking shift element is also implementable using comparatively little outlay for open-loop and closed-loop control.

For this reason, a simple software-based evaluation of an actuating current of a pressure regulator of a friction-locking shift element is sufficient. During the detection of an appropriate disengagement control signal or an appropriate engagement control signal for transferring the friction-locking shift element into the disengaged operating condition or into the engaged operating condition, respectively, it is verifiable in a simple way, via such an evaluation, whether a shift change or gearchange was successful.

Disadvantageously, however, friction-locking shift elements in the disengaged operating condition cause drag torques, which adversely affect an overall efficiency of an automatic transmission to an undesirable extent.

For this reason, transmission devices, such as those described in DE 10 2008 000 429 A1, are being designed to an increasing extent including not only friction-locking shift elements but also form-locking shift elements. These types of form-locking shift elements usually have two shift-element halves. The shift-element halves are bringable into form-locking engagement with each other via axial displacement of at least one movable shift-element half with respect to the other shift-element half, which is then designed not to be axially displaceable, in the area of dog elements, or the like. Thereupon, the form-locking shift element is engaged and transmits an applied torque. Moreover, it is also possible that both shift-element halves are designed to be axially movable with respect to each other.

If the form-locking shift element is to be disengaged from the power flow, the positive engagement between the shift-element halves is disengaged via axial displacement of the movable shift-element half with respect to the axially non-displaceable shift-element half. The reason for the utilization of form-locking shift elements is that, in contrast to friction-locking shift elements, essentially no drag torques occur in the area of disengaged form-locking shift elements. Drag torques adversely affect the overall efficiency of a transmission. It is to be taken into account in this case, however, that form-locking shift elements, in comparison to friction-locking shift elements, are transferrable out of a disengaged operating condition, in which no torque is transmissible via the form-locking shift elements, into their engaged operating condition only close to a synchronous speed.

Additionally, form-locking shift elements engaged into the power flow of a transmission device are disengageable from the power flow or transferrable into the disengaged operating condition using low shifting forces if the applied torque has an appropriately low value. During gear change operations or gear disengagement operations, a power flow between a transmission input shaft and a transmission output shaft is to be interrupted in the area of a transmission. In this case, a form-locking shift element is to be transferred, if necessary, from the engaged operating condition into the disengaged operating condition. Due to an excessively rapid or faulty build-up of the torque applied in the area of the form-locking shift element, or due to a faulty reduction of the applied torque, the form-locking shift element may possibly not be transferrable into the disengaged operating condition. In addition, it is also possible that mechanical, hydraulic, or electrical malfunctions prevent the disengagement of a form-locking shift element. For this reason, form-locking shift elements, in contrast to friction-locking shift elements, do not necessarily transition into a disengaged operating condition in the presence of an appropriate disengagement control signal.

Additionally, it is also possible that a disengaged form-locking shift element is not transferrable into its engaged operating condition within desirably short operating times. This is the case, for example, when the sought positive engagement between the shift-element halves is not establishable, for example, due to a tooth-on-tooth position. In the event of such a tooth-on-tooth position, dog elements of the shift-element halves rest against each other in the area of their end faces and the differential speed between the shift-element halves is zero. Such a tooth-on-tooth position is released only for the case in which a torque applied at the form-locking shift element is greater than the static friction torque between the end faces of the dog elements of the shift-element halves.

Moreover, the establishment of a complete positive engagement or the complete engagement of a form-locking shift element can also be prevented by a flank clamping between the flanks of the dog elements. In the event of such a flank clamping, the two shift elements have a certain axial overlap in the area of their dog elements. However, the static friction between the flanks of the dog elements of the shift-element halves, which are resting against each other, is so high that the engagement force acting on the shift elements in the engagement direction is not sufficient to overcome the static friction and completely engage the form-locking shift element.

If a form-locking shift element remains in an intermediate position, which is located between a completely disengaged operating condition and a completely engaged operating condition, during an engagement process, attempts are made by various approaches to release this undesirable intermediate position. It is problematic in this case, however, that the approaches for releasing a tooth-on-tooth position or a flank clamping differ greatly from one another and, if applied incorrectly, adversely affect ride comfort and lengthen shift times to a considerable extent. This results from the fact that the approach for releasing a tooth-on-tooth position strengthens a flank clamping and the approach for releasing a flank clamping maintains a tooth-on-tooth position.

Sensors are installed in order to be able to monitor the particular existing operating condition of a form-locking shift element. These sensors include, for example, a permanent magnet and a measuring unit for sensing the magnetic field of the permanent magnet. Additionally, the sensors have a ferromagnetic sensor contour, which influences the magnetic field of the permanent magnet as a function of the operating conditions of the shift-element halves. Various magnetic field-sensing elements are known, such as elements or magnetoresistive elements based on a Hall effect. Magnetic field sensors generally include elements sensing a magnetic field or other electronic components, wherein some magnetic field sensors include permanent magnets in a back-biased arrangement.

These types of magnetic field sensors provide electrical signals, which represent the condition of a sensed magnetic field. In some arrangements, magnetic field sensors cooperate with ferromagnetic objects. Via the magnetic field sensors, magnetic field fluctuations are determined, which are caused by an object moved through the magnetic field of a magnet of a magnetic field sensor. The magnetic field monitored by the magnetic field sensor also varies, as is known, as a function of a shape or a profile of the moving ferromagnetic object. The position determination of the shift-element halves is calculated directly from the raw signals of the sensors with the aid of applicable thresholds.

Disadvantageously, this approach causes all tolerances of the sensor and of the sensing system, as well as the production-related scatterings, to flow into the position determination. As a result, the position determination of the shift-element halves does not have the accuracy necessary for operating a transmission.

The poor accuracy of the determination of the position of the shift-element halves with respect to each other during a disengagement process or an engagement process may also result in the correct approach not being carried out for releasing the intermediate position of the shift element when a form-locking shift element has seized, in particular during an engagement process.

BRIEF SUMMARY OF THE INVENTION

Starting from the above-described background, example aspects of the invention provide a method for determining an actuating-travel range between two shift-element halves of a form-locking shift element, by which, in particular, an actuating-travel range of a form-locking shift element is determinable, within which a tooth-on-tooth position can occur. Additionally, a control unit, which is designed for carrying out the method, and a computer program product for carrying out the method are also provided.

A method is provided for determining an actuating-travel range between two shift-element halves of a form-locking shift element. The shift-element halves are bringable into engagement or out of engagement with each other in a form-locking manner by moving at least one of the shift-element halves with respect to the other shift-element half. The determination of the actuating-travel range takes place during an engagement of the form-locking shift element and in the presence of a tooth-on-tooth position between the two shift-element halves. An actuating movement of the at least one movable shift-element half with respect to the other shift-element half is monitored by a sensor.

In the present case, for example, dog clutches and constant-mesh shift elements, which transmit a torque via a form-locking connection, are subsumed under the term "form-locking shift element". Moreover, shift elements designed as clutches or brakes in the present case are subsumed in the following under the term "friction-locking shift element", which transmit a torque via a friction-locking connection. The torque transmissible by a friction-locking shift element varies as a function of the particular engagement force applied at the friction-locking shift element and is preferably infinitely variable. The engagement force corresponds, for example, to a hydraulic pressure applied at the shift element. In contrast thereto, the particular torque transmissible by a form-locking shift element is not infinitely variable.

Example aspects of the invention now encompasses the technical teaching that a tooth-on-tooth position is identified when it is detected, by the sensor, within an actuating-travel range of the at least one movable shift-element half between a disengaged condition and an engaged condition of the shift element, that the actuating movement of the at least one movable shift-element half in the engagement direction is zero. Moreover, a check is carried out to determine whether a ratio between an engagement force applied at the shift element and a radial force acting on the shift-element halves, which results from a torque applied at the shift element, is within a value range, within which a tooth-on-tooth position very likely occurs. Moreover, a tooth-on-tooth position is determined for the case in which an actuating movement of the at least one movable shift-element half in the engagement direction is detected by the sensor after a reduction of the engagement force and/or after an increase of the applied torque.

Via the approach according to example aspects of the invention, it is unambiguously distinguishable, in a simple way, as to whether the form-locking shift element was not moved, during an actuation within the current actuating-travel range, to the demanded extent in the direction of the engaged or the disengaged operating condition due to a tooth-on-tooth position or due to a flank clamping.

On the basis of the exact knowledge of the actuating-travel range between two shift-element halves of a form-locking shift element, within which a tooth-on-tooth position occurs, the measure provided for releasing a tooth-on-tooth position is triggerable and the tooth-on-tooth position is terminable to the desired extent. As a result, for example, a gear shift within a transmission, to which the form-locking shift element contributes, is implementable in a simple way within short shift times.

Additionally, if the shift element is not transferrable into the engaged operating condition to the desired extent due to a flank clamping, it is also possible to release the flank clamping by the suitable measures and to be able to transfer the form-locking shift element into the engaged operating condition within short operating times. If the flank clamping occurs, for example, in the case of a detected extent of overlap greater than a threshold value, a releasing measure of the flank clamping may also be possibly omitted in its entirety. This threshold value corresponds to an overlap limit, at which the particular torque applied at or to be applied at the form-locking shift element is transmissible by the form-locking shift element without causing impermissibly high loads in the area of the flanks.

In an advantageous example variant of the method according to example aspects of the invention, the determination of the actuating-travel range between the shift-element halves is started if an actuating movement of the at least one movable shift-element half in the engagement direction equal to zero is determined by the sensor. However, the determination of the actuating-travel range between the shift-element halves is first started for the case in which a signal of the sensor within a time period, which is equal to a predefined time period or is longer than the predefined time period, is greater than or equal to a predefined lower threshold value and less than or equal to a predefined upper threshold value.

As a result, the determination of the actuating-travel range is first carried out for the case in which the presence of a tooth-on-tooth position is likely and the intermediate position, for which the determination is carried out, is characterized by sufficient stability.

If the determination of the actuating-travel range between the shift-element halves corresponding to a tooth-on-tooth position is carried out for the first time, then, according to an advantageous example variant of the method according to example aspects of the invention, the minimum value of the signal of the sensor and the maximum value of the signal of the sensor delimit the actuating-travel range between the shift-element halves.

This means, the two extreme values determined for the first time by the sensor form the limits of the actuating-travel range of the shift-element halves, within which a tooth-on-tooth position is to be expected.

In a further advantageous example variant of the method according to example aspects of the invention, the limits of the actuating-travel range are changed as a function of further values of the signal of the sensor if the further values of the signal of the sensor deviate from the previously determined values of the signal of the sensor by more than an absolute value of a threshold value in each case. The further values of the signal of the sensor are determined for a detected tooth-on-tooth position, in each case, during further determinations of the actuating-travel range between the shift-element halves.

By this approach, the actuating-travel range is increased or expanded with little outlay if smaller minimum positions of the shift-element halves and/or larger maximum positions of the shift-element halves are determined.

In a further advantageous example variant of the method according to example aspects of the invention, the limits of the actuating-travel range are varied as a function of the particular currently determined values of the signal of the sensor. The values of the signal of the sensor are changed for the case in which a distance between the actuating-travel range defined by the currently determined values of the signal of the sensor and the actuating-travel range that was previously determined is less than or equal to a predefined threshold value. Therefore, it is validated, in a simple way, whether the previous actuating-travel range or tooth-on-tooth range and the newly detected actuating-travel range or tooth-on-tooth range are too far apart from each other.

If the actuating-travel ranges are too far apart from each other and if the previously determined actuating-travel range was established as a function of a number of detected tooth-on-tooth positions that is less than a threshold value, then, in a further advantageous example variant of the method according to example aspects of the invention, the limits of the previously determined actuating-travel range are discarded. The actuating-travel range is then redetermined in a subsequent determination of a tooth-on-tooth position.

Therefore, an incorrect determination of the actuating-travel range is avoided in a simple way, even if a low number of tooth-on-tooth positions was initially detected.

In an advantageous example variant of the method according to example aspects of the invention, the determination of the actuating-travel range at the desired high level of accuracy is ensured throughout the service life of the form-locking shift element. For this purpose, the actuating-travel range is increased, by varying the limits as a function of the determined values of the signal of the sensor, for as long as it takes for a distance between the limits of the actuating-travel range to be greater than or equal to a predefined maximum value.

In an example variant of the method according to example aspects of the invention, the minimum value of the signal of the sensor determined in each case for a tooth-on-tooth position and the likewise determined maximum value of the signal of the sensor are compared to the respective limits of an actuating-travel range that was already determined as a function of a number of ascertained tooth-on-tooth positions greater than a threshold value. The limits of the actuating-travel range are increased or decreased by an offset if the determined minimum value and the determined maximum value of the signal of the sensor deviate from the lower limit or from the upper limit, respectively, of the actuating-travel range by values greater than an absolute value of a threshold value.

In an example variant of the method according to example aspects of the invention, the limits of the actuating-travel range are respectively varied as a function of the minimum value of the signal of the sensor determined for a tooth-on-tooth position or the likewise determined maximum value of the signal of the sensor. This is the case when the distance between the limits of the actuating-travel range has already reached or fallen below the maximum value, and the minimum value or the maximum value of the signal of the sensor is outside the actuating-travel range. The limits of the actuating-travel range are then each adapted, in a mutually coordinated manner, in such a way that the distance between the limits of the adapted actuating-travel range essentially does not exceed the maximum distance. It is therefore ensured that the detection of a tooth-on-tooth position is carried out with little outlay throughout the service life of a form-locking shift element with the desired high level of accuracy.

In a further advantageous example variant of the method according to example aspects of the invention, two actuating-travel ranges are determined starting from two predefined actuating-travel ranges between the shift-element halves that overlap. This is the case when each of the shift-element halves is designed having two groups of dog elements. The first group of dog elements has a longer length in the actuation direction of the at least one movable shift-element half than the dog elements of the second group. Additionally, the dog elements of the two groups are arranged next to one another in alternation in the circumferential direction of the shift-element halves.

Therefore, tooth-on-tooth positions of such a form-locking shift element, which can occur between the longer dog elements of the shift-element halves as well as between the longer dog elements of the one shift-element half and the shorter dog elements of the other shift-element half, are determinable to the desired extent with little outlay.

It is possible that the limits of the actuating-travel ranges are adapted for as long as it takes for all values of the signal of the sensor, which are determined for tooth-on-tooth positions and lie within the overlap area of the two actuating-travel ranges, to be assigned to only one of the two actuating-travel ranges. As a result, it is ensured that tooth-on-tooth positions for the latter-mentioned operating conditions of a shift element designed with a catch tooth dog can each be assigned to the one actuating-travel range or to the other actuating-travel range.

By a further advantageous example variant of the method according to example aspects of the invention, incorrect determinations are avoided with little outlay. For this purpose, it is provided that the actuating-travel range has a minimum width and corresponds to a value range for signals of the sensor, which are determined for tooth-on-tooth positions between the longer dog elements of the shift-element halves. The minimum width of this actuating-travel range is provided in such a way that the minimum values and maximum values of the signal determined for a tooth-on-tooth position are both encompassed by the actuating-travel range. Additionally, the minimum width is also established as a function of deviations of the signals, which result from load-induced movements of the entire shift element with respect to the sensor and from a tolerance-related sensor behavior.

The invention also generally relates to a control unit, which is designed for carrying out the method according to example aspects of the invention. The control unit includes, for example, means utilized for carrying out the method according to example aspects of the invention. These means can be hardware-related means and software-related means. The hardware-related means of the control unit or of the control device are, for example, data interfaces for exchanging data with the assemblies of the vehicle drive train contributing to the carrying-out of the method according to example aspects of the invention. Further hardware-related means are, for example, a memory for data storage and a processor for data processing. Software-related means can be, among other things, program modules for carrying out the method according to example aspects of the invention.

In order to carry out the method according to example aspects of the invention, the control unit is implementable with at least one receive interface, which is designed for receiving signals from signal transmitters. The signal transmitters can be designed, for example, as sensors, which gather measured quantities and transmit signals corresponding to the measured quantities to the control unit. A signal transmitter can also be referred to as a signal sensoring element. In this way, the receive interface can receive a signal from a signal transmitter, via which it is signaled that an actuating-travel range between two shift-element halves of a form-locking shift element is to be determined. The signal can be generated, for example, by an operator, in that the operator actuates a control element, via which such a determination can be demanded. Moreover, the signal can also be generated by a driving strategy, which is activated and carried out in the area of the control unit or in the area of a further control unit of the vehicle drive train.

The control unit can also include a data processing unit, in order to evaluate and/or process the received input signals or the information of the received input signals.

The control unit can also be implemented with a transmit interface, which is designed for outputting control signals to actuating elements. An actuating element is understood to refer to actuators that implement the commands of the control unit. The actuators can be designed, for example, as electromagnetic valves.

If, during the actuation of the form-locking shift element, it is detected by the control unit or determined on the basis of received input signals that an actuating-travel range between two shift-element halves of the form-locking shift element is to be determined, the control unit determines, on the basis of gathered input signals, an appropriate demand and initiates an appropriate determination. The shift-element halves are bringable into engagement or out of engagement with each other in a form-locking manner by moving at least one of the shift-element halves with respect to the other shift-element half. The determination is carried out by the control unit during an engagement of the form-locking shift element and in the presence of a tooth-on-tooth position between the two shift-element halves. Additionally, an actuating movement of the at least one movable shift-element half with respect to the other shift-element half is monitored by a sensor.

The control unit is designed in such a way that a tooth-on-tooth position is detected when it is determined, by the sensor, within an actuating-travel range between the shift-element halves between a disengaged condition and an engaged condition of the shift element, that the relative movement between the shift-element halves in the engagement direction is zero. Additionally, a tooth-on-tooth position is detected by the control unit for the case in which a ratio between an engagement force applied at the shift element and a radial force acting on the shift-element halves is within a value range, within which a tooth-on-tooth position is very likely. The radial force results from a torque applied at the shift element. Moreover, the control unit detects a tooth-on-tooth position for the case in which a movement of the displaceable shift-element half in the engagement direction is determined by the sensor after a reduction of the engagement force and/or after an increase of the torque applied at the shift element.

As a result, it is ensured in a simple way, that a tooth-on-tooth position and the actuating-travel range of the shift-element halves of a form-locking shift element corresponding thereto are detected and determined with great accuracy, in order to ensure a high level of ride comfort, on the one hand and, on the other hand, to be able to carry out gear shifts within desirably short shift times. Moreover, irreversible damage is therefore also avoidable in a simple way in the area of a form-locking shift element.

The aforementioned signals are to be considered merely as examples and are not intended to limit the invention. The gathered input signals and the output control signals can be transmitted via a vehicle bus, for example, via a CAN-BUS. The control device or the control unit can be designed, for example, as a central electronic control unit of the vehicle drive train or as an electronic transmission control unit.

The approach according to example aspects of the invention can also be embodied as a computer program product, which, when running on a processor of a control device, instructs the processor, via software, to carry out the assigned method steps, which are subjects of example aspects of the invention. In this context, a computer-readable medium, on which an above-described computer program product is retrievably stored, is also a subject of example aspects of the invention.

The invention is not limited to the described combination of the features of the other independent claims or of the claims dependent thereon. In addition, possibilities result for combining individual features with one another, also provided they arise from the claims, the following description of embodiments, or directly from the drawing. The reference in the claims to the drawings via the use of reference characters is not intended to limit the scope of protection of the claims.

BRIEF DESCRIPTION OF THE DRAWINGS

An exemplary embodiment of the invention is explained in greater detail with reference to the drawings, without being limited thereto. In the drawings:

FIG. 1 shows a schematic of a vehicle drive train with a prime mover, with a transmission, and with a driven end;

FIG. 2 shows a shift logic, in table form, of the transmission shown in FIG. 1;

FIG. 3a through FIG. 3e show various operating conditions of a form-locking shift element, which is represented in a highly diagrammatical manner, between a completely disengaged condition and a completely engaged condition;

FIG. 4a through FIG. 4f show representations corresponding to FIG. 3a of various operating conditions of a form-locking shift element, the dog elements of which are designed having different lengths;

FIG. 8a and FIG. 8b each show a representation corresponding to FIG. 6a through 6d of a further approach for determining, in a defined way, actuating-travel ranges for tooth-on-tooth positions of a shift element according to FIG. 4a; FIG. 4a is monitorable.

DETAILED DESCRIPTION

Figure 5A:
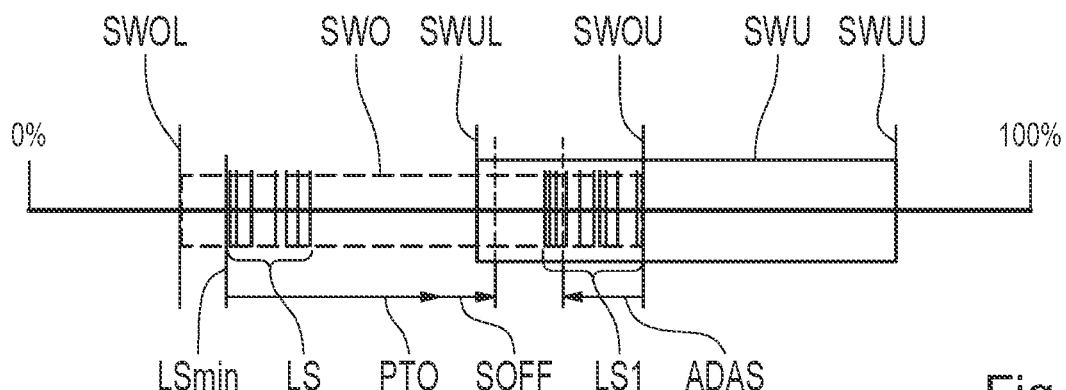
FIG. 5a shows an actuating travel of the form-locking shift element according to FIG. 4a between a completely engaged condition and a completely disengaged operating condition as well as a first predefined actuating-travel range and a second predefined actuating-travel range, within which tooth-on-tooth positions are expected between longer dog elements and between longer and shorter dog elements of the shift-element halves.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic of a vehicle drive train 1 with a prime mover 2, with a transmission 3, and with a driven end 4. The prime mover 2 is designed as an internal combustion engine in this case. The transmission 3 is an automatic transmission, in which multiple gear stages "1" through "9" for forward travel and at least one gear stage "R" for travel in reverse are implementable. As a function of the particular configuration of the vehicle drive train 1, the driven end 4 has one, two, or also multiple drivable vehicle axles, to which the torque of the prime mover 2 is applicable via the transmission 3. Hydraulically actuatable shift elements A through F are actuated during a ratio change in the transmission 3, i.e., during upshifts or downshifts in the transmission 3. The ratio changes are to be carried out essentially without an interruption of tractive force, in combination with a high level of ride comfort and at a desired level of performance. The term "performance" is understood to mean a ratio change in the transmission 3 that is implemented within a defined operating time.

In order to be able to carry out the particular demanded gear shift to the desired extent, the shift elements A through F are each acted upon by shift sequences stored in a transmission control unit and a shift pressure corresponding to the particular shift sequence.

The transmission 3 includes a transmission input shaft 5 and a transmission output shaft 6. The transmission output shaft 6 is connected to the driven end 4. In the present case, a torsion damper 7 and, as a starting component, a hydrodynamic torque converter 8 including an associated torque converter lockup clutch 9 are arranged between the transmission input shaft 5 and the prime mover 2.

In addition, the transmission 3 includes four planetary gear sets P1 through P4. The first planetary gear set P1 and the second planetary gear set P2, which are preferably designed as minus planetary gear sets, form a shiftable front-mounted gear set. The third planetary gear set P3 and the fourth planetary gear set P4 represent a main gear set. The shift elements C, D, and F of the transmission 3 are designed as brakes, while the shift elements A, B, and E represent separating clutches.

A selective shifting of the gear stages "1" through "R" is implementable by the shift elements A through F according to the shift logic represented in greater detail in FIG. 2. In order to establish a power flow in the transmission, essentially three of the shift elements A through F are to be transferred into or held in an engaged operating condition essentially simultaneously in each case.

The shift elements A and F are designed, in this case, as form-locking shift elements without additional synchronization. As a result, in comparison to transmissions designed only with friction-locking shift elements, drag torques caused by disengaged friction-locking shift elements are reduced in the case of the transmission 3.

As is known, form-locking shift elements are generally transferrable out of a disengaged operating condition into an engaged operating condition only within a very narrow differential speed range, encompassing the synchronous speed, between the shift-element halves to be brought into an operative connection with each other in a form-locking manner. If the synchronization of a form-locking shift element to be engaged is not implementable by additional structural embodiments, the synchronization is implemented via an appropriate actuation of the further friction-locking shift elements contributing to the gear shift and/or an engine override. During such an engine override, for example, the drive torque made available by the prime mover 2 is varied in the coasting condition as well as in the traction operation of the vehicle drive train 1 to the extent necessary for the synchronization. This also applies for the actuation of the friction-locking shift elements during the carrying-out of demanded traction or coasting shifts.

FIG. 3*a* through FIG. 3*e* each show two shift-element halves 10, 11 of the form-locking shift element A or F in various operating conditions. FIG. 3*a* shows the completely disengaged operating condition of the form-locking shift element A or F, in which there is no positive engagement between the two shift-element halves 10 and 11 and in which the shift-element halves 10 and 11 are spaced apart from each other in the axial direction x.

The shift-element halves 10 and 11 include dog elements 10A and 11A, respectively. The dog elements 10A and 11A are bringable into engagement with each other in a form-locking manner as a function of the particular current application via axial displacement of the shift-element half 10 and/or of the shift-element half 11 with respect to the shift-element half 11 or the shift-element half 10, respectively, in order to be able to transmit a torque applied at the form-locking shift element A or F to the desired extent.

In the presence of an appropriate demand to engage the form-locking shift element A or F, an appropriate actuation force is applied, in the engagement direction, on the particular displaceably designed shift-element half 10 or 11. As a result, the axial distance between the end faces 10B and 11B of the dog elements 10A and 11A, respectively, facing each other is increasingly reduced.

If the differential speed between the shift-element halves 10 and 11 is too great, the dog elements 10A and 11A are not bringable into engagement with each other in a form-locking manner. In such a case, a rattling occurs, during which the dog elements 10A and 11A glide off of one another, in the area of their facing end faces 10B and 11B, in the circumferential direction of the shift-element halves 10 and 11 to the extent shown in FIG. 3*b*. Such a rattling is undesirable, however, since the rattling causes irreversible damage in the area of the dog elements 10A and 11A as the operating time increases.

For this reason, the differential speed between the shift-element halves 10 and 11 is adjusted to values within a differential speed window, which encompasses the synchronous speed of the form-locking shift element A or F, via appropriate actuation of the particular friction-locking shift elements B through E contributing to the operating condition change in the transmission 3. Within this differential speed window, the dog elements 10A and 11A of the shift-element halves 10 and 11, respectively, are bringable into engagement with each other in a form-locking manner to the desired extent.

It is to be noted, however, that the positive engagement to be established can be prevented by a tooth-on-tooth position between the shift-element halves 10 and 11. The tooth-on-tooth position, as represented in FIG. 3*c*, is characterized in that the dog elements 10A and 11A rest against each other in the area of their end faces 10B and 11B, respectively, and the differential speed between the shift-element halves 10 and 11 is zero. During such a tooth-on-tooth position of the form-locking shift element A or F, the static friction between the end faces 10B and 11B of the dog elements 10A and 11A, respectively, is so great that the torque applied at the form-locking shift element A or F is transmitted via the form-locking shift element A or F without the tooth-on-tooth position being released.

In order to release the tooth-on-tooth position, it is advantageous if the actuation force applied at the form-locking shift element A or F in the engagement direction is reduced and/or the torque applied at the form-locking shift element A or F is increased. The static friction in the area between the end faces 10B and 11B of the dog elements 10A and 11A, respectively, is reduced due to the reduction of the engagement force. Simultaneously, by raising the torque applied at the form-locking shift element A or F, the static friction between the end faces 10B and 11B is overcome and the differential speed between the shift-element halves 10 and 11 increases to an extent enabling the establishment of the positive engagement between the dog elements 10A and 11A.

FIG. 3*d* shows an operating condition of the form-locking shift element A or F, in which a positive engagement between the shift-element halves 10 and 11 is present with a partial overlap of the dog elements 10A and 11A. Such an operating condition is present during a disengagement process as well as during an engagement process of the form-locking shift element A or F.

The torque acting on the shift element A or F and the coefficients of friction of the flanks 10C and 11C yield a static friction force, which acts between the flanks 10C, 11C. If the actuation force acting on the shift-element halves 10 and 11 in the disengagement direction or in the engagement direction of the form-locking shift element A or F is too low in relation to the static friction force between the flanks 10C and 11C of the dog elements 10A and 11A, respectively, flank clamping occurs. During such a flank clamping, the axial relative actuating movement between the shift-element halves 10 and 11 in the engagement direction or in the disengagement direction is zero, and so the demanded operating condition change of the form-locking shift element A or F does not take place. In order to avoid or release such a flank clamping, for example, the actuation force applied at the shift element A or F can be increased and/or the particular torque applied at the form-locking shift element A or F can be reduced to the extent necessary for this purpose.

The completely engaged operating condition of the form-locking shift element A or F is represented in FIG. 3*e*, in which the full overlap between the dog elements 10A and 11A in the axial direction x is present.

FIG. 4*a* through FIG. 4*f* each show a representation of the form-locking shift element A or F corresponding to FIG. 3*a*. In the case of the shift element A or F, the dog elements 10A and 11A of the shift-element halves 10 and 11, respectively, which are arranged next to one another in the circumferential direction of the shift-element halves 10 and 11, each have a different length in the axial direction x. In the following, the longer dog elements are described in greater detail with reference to reference characters 10A1 and 11A1 and the shorter dog elements are described in greater detail with reference to reference characters 10A2 and 11A2.

This example embodiment of the form-locking shift elements A and F offers the advantage that the positive engagement between the shift-element halves 10 and 11 is establishable at higher differential speeds between the shift-element halves 10 and 11 than is the case with the example embodiment of the form-locking shift elements A and F represented in FIG. 3*a* through FIG. 3*e*. In contrast thereto, the example embodiment of the form-locking shift element A or F according to FIG. 4a through FIG. 4f is less robust against rattling in comparison to the embodiment of the form-locking shift element A or F according to FIG. 3a through FIG. 3e.

The shift element A or F can have further operating conditions, due to the dog elements 10A1, 10A2 as well as 11A1 and 11A2 designed having different lengths, in addition to the operating conditions of the form-locking shift element A or F described with reference to FIG. 3a through FIG. 3e. The further operating conditions will be described in greater detail in the following description of FIG. 4a through FIG. 4f.

Initially, the completely disengaged operating condition of the shift element A or F is represented in FIG. 4a. FIG. 4b shows the operating condition of the form-locking shift element A or F during a rattling operation. During the rattling operation, the shift-element halves 10 and 11 glide off of each other, in the area of the end faces 1061 and 11B1 of the longer dog elements 10A1 and 11A1, respectively, in the circumferential direction. Therefore, the positive engagement between the shift-element halves 10 and 11 is not establishable. This rattling operation is avoidable or terminable to the extent described with reference to FIG. 3b by reducing the differential speed between the shift-element halves 10 and 11.

Moreover, FIG. 4c and FIG. 4d each show a tooth-on-tooth position, which prevents the establishment of the positive engagement between the shift-element halves 10 and 11. In the operating condition of the form-locking shift element A or F represented in FIG. 4c, the tooth-on-tooth position is between the end faces 1061 and 11B1 of the longer dog elements 10A1 and 11A1, respectively. In contrast thereto, the tooth-on-tooth position between the shift-element halves 10 and 11 in the operating condition of the form-locking shift element A or F represented in FIG. 4d is between the end faces 1161 of the longer dog elements 11A1 of the shift-element half 11 and the end faces 1062 of the shorter dog elements 10A2 of the shift-element half 10.

Regardless thereof, the particular tooth-on-tooth position between the shift-element halves 10 and 11 is releasable and/or avoidable in the way described with reference to FIG. 3c.

FIG. 4e shows an intermediate operating condition of the form-locking shift element A or F between the completely disengaged operating condition and the completely engaged operating condition of the form-locking shift element A or F. During this intermediate operating condition, the flank clamping—which is described in greater detail above—between the dog elements 10A1, 10A2 and the dog elements 11A1, 11A2, respectively, can occur. The flank clamping is avoidable and/or releasable to the extent described with reference to FIG. 3d, in order to be able to disengage or engage the form-locking shift element A or F to the demanded extent.

The completely engaged operating condition of the form-locking shift element A or F is represented in FIG. 4f.

An advantageous approach is described in the following, by which an actuating-travel range between the two shift-element halves 10 and 11 of the form-locking shift element A or F according to FIG. 3a is determinable, within which the tooth-on-tooth position shown in FIG. 3c can occur. For this purpose, the form-locking shift element A or F is initially acted upon, starting from the disengaged operating condition shown in FIG. 3a, with an actuation force in the direction of the engaged operating condition shown in FIG. 3e. As the operating time increases, the movably designed shift-element half 10 is displaced in the axial direction x toward the shift-element half 11, which is designed not to be axially displaceable.

If it is determined by the particular sensor associated with the form-locking shift element A or F that the actuating movement of the shift-element half 10 is zero, a timer is started and, thereafter, a check is carried out to determine whether the shift-element half 10 has remained in the current position for a predefined time period. Additionally, the progression of the signal of the sensor is observed. If the sensor signal does not fall below a predefined lower limit and does not exceed a likewise predefined upper limit for the predefined time period, a certain stability of the sensor signal is established and the intermediate position of the form-locking shift element A or F is evaluated as sufficiently stable. This evaluation result triggers the start of an adaptation, by which a predefined standard actuating-travel range is adapted to the real system, which includes the form-locking shift element A or F and the particular associated sensor.

Initially, a ratio between the engagement force acting on the form-locking shift element A or F and acting in the axial direction, and a radial force acting on the shift element A or F is calculated. Therefore, it is very likely determinable whether the shift element remains in the intermediate position due to a tooth-on-tooth position or due to a flank clamping and is not transferrable into the engaged operating condition. The radial force results from the torque applied at the form-locking shift element A or F. Additionally, a check is carried out to determine whether the shift element A or F has left the intermediate position, from which the shift element initially was not transferrable into the engaged condition, with the above-described measure for releasing a tooth-on-tooth position or by the approach for releasing a flank clamping.

In the present case, the ratio between the axial actuation force and the radial force applied at the form-locking shift element A or F is within a value range facilitating a tooth-on-tooth position. Moreover, the intermediate position of the form-locking shift element A or F was released by implementing the approach, by which a tooth-on-tooth position is terminated. For this reason, a tooth-on-tooth position is determined for the intermediate position.

A value range of the ratio between the axial force and the radial force facilitating a tooth-on-tooth position represents force ratios, in each case, at which the static friction force in the area between the end faces 10B and 11B of the shift-element halves 10 and 11, respectively, is greater than the radial force resulting from the applied torque. In such an operating condition of the form-locking shift element A or F, the applied torque is transmitted via the force-fit connection between the shift-element halves 10 and 11, which is present in the area of the end faces 10B and 11B, wherein the relative turning motion between the shift-element halves 10 and 11 is then zero.

Moreover, a check is carried out, before the actuating-travel range between the two shift-element halves 10 and 11 of the form-locking shift element A or F is established, to determine whether the adaptation for the first detected tooth-on-tooth position takes place, whether some tooth-on-tooth positions have already been detected, or if a certain number of tooth-on-tooth positions greater than a threshold value has already been determined.

If the adaptation is carried out on the basis of the first detected tooth-on-tooth position, the minimum value of the signal of the sensor and the maximum value of the signal of the sensor form the limits of the actuating-travel range or the tooth-on-tooth range. These values are stored for the interim and are utilized as comparison values for subsequent adaptations.

The above-described approach is carried out every time a standstill is detected, by the sensor, of the shift-element half 10 movable in the axial direction x during an engagement process of the form-locking shift element A or F. If a tooth-on-tooth position is very likely detected on the basis of the aforementioned test criteria, the buffered limits of the actuating-travel range are compared to the minimum value of the signal of the sensor and the maximum value of the signal of the sensor, which were determined for the currently ascertained tooth-on-tooth position of the form-locking shift element A or F.

The actuating-travel range or the tooth-on-tooth range is increased if the current values of the signals of the sensors are less than or greater than the previous limits of the actuating-travel range. Initially, a check is carried out, however, to determine whether the previous tooth-on-tooth range and the newly determined actuating-travel range do not lie too far apart from each other. If this should be the case, the currently determined tooth-on-tooth range and the already learned tooth-on-tooth range or actuating-travel range are deleted.

If a tooth-on-tooth position is determined during a further engagement process of the form-locking shift element A or F, the minimum and maximum values of the signal of the sensor determined therefor are stored as new limits of the actuating-travel range.

This approach is carried out for as long as the number of detected tooth-on-tooth positions is less than a predefined value.

If the actuating-travel range between the two shift-element halves 10 and 11 of the form-locking shift element A or F has already been determined and adapted for a defined number of detected tooth-on-tooth positions greater than the predefined value, the minimum and maximum values of the signal of the sensor determined for a detected tooth-on-tooth position are compared to the actuating-travel range. If the currently determined minimum and/or maximum value(s) of the signal of the sensor lie/lies outside the actuating-travel range, the limits of the actuating-travel range are each increased by an offset in the appropriate direction. This continues for as long as it takes for the lower limit and the upper limit of the actuating-travel range to have a maximum distance from each other.

If this is the case and if the upper limit of the actuating-travel range is to be raised or the lower limit of the actuating-travel range is to be reduced, the lower limit is also raised by the same increment or the upper limit is also reduced by the same increment, respectively. As a result, the demanded adaptation is implemented without further increasing the width of the actuating-travel range.

FIG. 5a through FIG. 5d show a graphic representation of an adaptation process of two predefined actuating-travel ranges SWO and SWU with respect to the transmission 3. With reference to the representations according to FIG. 5a through FIG. 5d, it is described in greater detail in the following how reference values LS and LS1 of the sensor of shift element A or F according to FIG. 4a can be unambiguously associated with the upper actuating-travel range SWO or with the lower actuating-travel range SWU, respectively. The upper actuating-travel range SWO defines an actuating-travel range of the movably designed shift-element half 10 with respect to the shift-element half 11, which is designed not to be movable in the axial direction x, within which a tooth-on-tooth position represented in FIG. 4c between the axially longer dog elements 10A1, 11A1 of the shift-element halves 10, 11, respectively, is likely. Simultaneously, the lower actuating-travel range SWU of the shift-element half 10 defines an actuating-travel range, within which tooth-on-tooth positions represented in FIG. 4d likely occur between the longer dog elements 10A1 or 11A1 of the shift-element half 10 or 11, respectively, and the shorter dog elements 10A2 or 11A2 of the shift-element half 10 or 11, respectively.

The actuating-travel ranges SWO and SWU shown in FIG. 5a, which are predefined standard actuating-travel ranges, are the starting point. The two actuating-travel ranges SWO and SWU have a smaller width than the overall actuating-travel range of the shift-element half 10, which extends from 0% to 100%. The form-locking shift element A or F is completely disengaged if the actuating travel is 0%. If the shift-element half 10 has been completely displaced and the actuating travel is 100%, the form-locking shift element A or F has been completely engaged. The predefined upper actuating-travel range SWO has a lower limit SWOL and an upper limit SWOU. Moreover, the width of the predefined lower actuating-travel range SWU is defined by the lower limit SWUL and by the upper limit SWUU. The lower limit SWUL of the lower actuating-travel range SWU and the upper limit SWOU of the upper actuating-travel range SWO are established in such a way that the upper actuating-travel range SWO and the lower actuating-travel range SWU overlap.

The vertical lines LS plotted in the upper actuating-travel range SWO and the further vertical lines LS1 plotted in the overlap area of the two actuating-travel ranges SWO and SWU correspond to values of the signal of the sensor that were determined for detected tooth-on-tooth positions of the form-locking shift element A or F according to FIG. 4a.

Since the sensor values corresponding to the lines LS are unambiguously assignable to the upper actuating-travel range SWO, it is assumed that the tooth-on-tooth positions each correspond to the tooth-on-tooth position between the longer dog elements 10A1 and 11A1 represented in FIG. 4c. In contrast thereto, the sensor values corresponding to the lines LS1, which were also determined for tooth-on-tooth positions of the form-locking shift element A or F, are not unambiguously assignable to the upper actuating-travel range SWO or to the lower actuating-travel range SWU.

For this reason, a safety actuating-travel range is defined in the direction of the engaged operating condition of the form-locking shift element A or F starting from the lowest sensor value LSmin. The safety actuating-travel range is composed, in the present case, of a first actuating-travel range PTO and a safety range SOFF. The first actuating-travel range PTO has such a width that scatterings of the signal of the sensor during the determination of the tooth-on-tooth position between the shift-element halves 10 do not bring about a faulty assignment or adaptation. These deviations result from sensor tolerances as well as from a gear clearance. The gear clearance causes the form-locking shift element A or F to be displaced, in its entirety, in the axial direction during the operation of the transmission 3 with respect to the associated sensor as a function of the particular load applied at the transmission 3, which prevents a precise determination of the exact position for the tooth-on-tooth position.

Figure 5B:
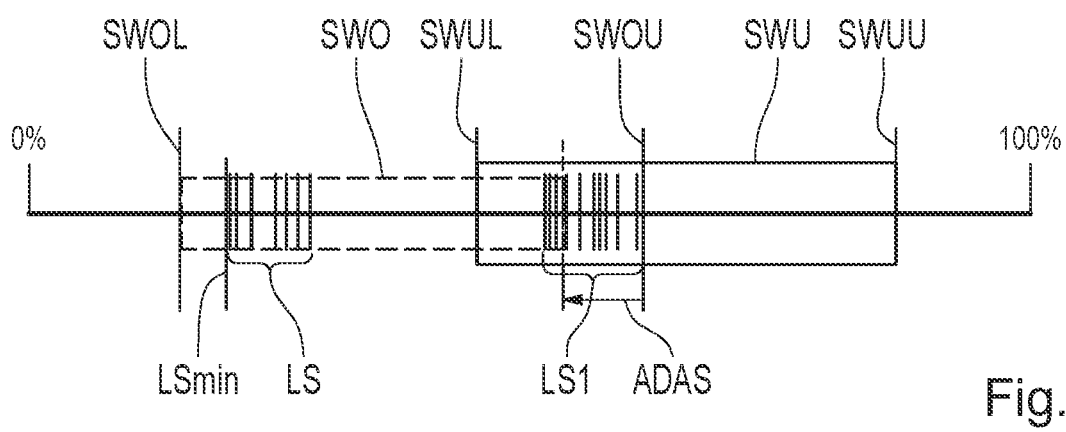
FIG. 5b through FIG. 5d each show a representation corresponding to FIG. 5a, wherein limits of the actuating-travel ranges are successively adapted in such a way that sensor signals corresponding to tooth-on-tooth positions are increasing assigned to only one of the actuating ranges in each case.

In a first step, the upper limit SWOU of the upper actuating-travel range SWO is displaced in the direction of the lower limit SWOL by an adaptation step ADAS to the extent shown in FIG. 5a and FIG. 5b. As a result, the width of the overlap area between the two actuating-travel ranges SWO and SWU is reduced. The adaptation step ADAS is an applicable value. The new upper limit SWOUn of the upper actuating-travel range SWO is outside the safety actuating-travel range.

Due to this approach, a portion of the sensor values LS1 is now associated only with the lower actuating-travel range SWU, while the remaining portion of the sensor values LS1 is still located in the overlap area between the upper actuating-travel range SWO and the lower actuating-travel range SWU.

Thereafter, a check is carried out to determine whether a further shortening of the upper actuating-travel range SWO by the adaptation step ADAS is possible without the new upper limit SWOUn1 being located within the safety actuating-travel range as a result.

Figure 5C:
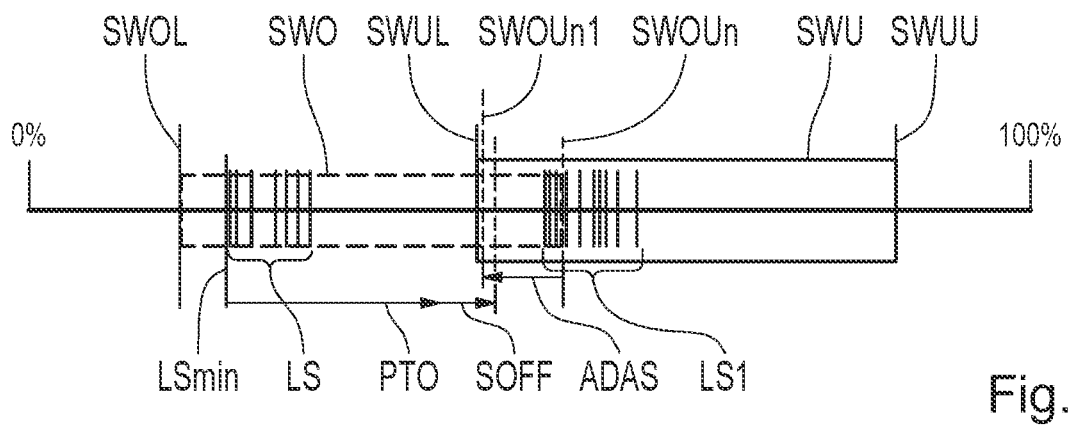

As shown in FIG. 5c, the further shortening of the upper actuating-travel range SWO by the adaptation step ADAS would result in the new upper limit SWOUn1 being located within the safety actuating-travel range.

Figure 5D:
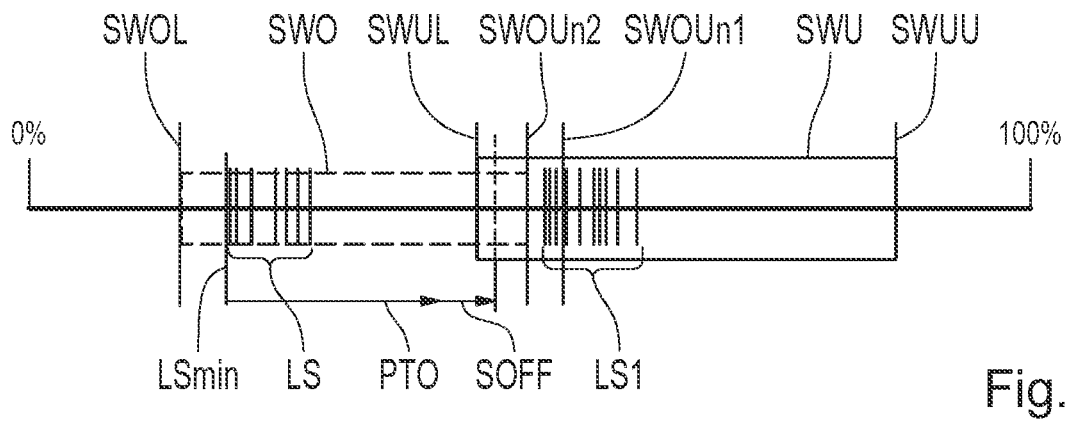

Since such an adaptation of the upper actuating-travel range SWO would open up the possibility that sensor values determined for tooth-on-tooth positions are not unambiguously assignable to the upper actuating-travel range SWO or to the lower actuating-travel range SWU, the distance between the new upper limit SWOUn and the safety actuating-travel range is determined. Thereafter, the width of the adapted actuating-travel range SWO is reduced only by half the distance in the direction of the lower limit SWOL. The upper actuating-travel range SWO, which has been shortened by this extent, is shown in FIG. 5d. The upper actuating-travel range SWO is now delimited by the lower limit SWOL and by the new upper limit SWOUn2.

As a result of the latter-described adaptation step of the upper actuating-travel range SWO, all sensor values LS1 are now associated with the lower actuating-travel range SWU, while the sensor values LS are still associated with the upper actuating-travel range SWO.

If further tooth-on-tooth positions are determined, which are located in the overlap area between the adapted upper actuating-travel range SWO according to FIG. 5b and the lower actuating-travel range SWU, the above-described approach is carried out again. The adaptation of the upper actuating-travel range SWO represented in FIG. 5c in the direction of the actuating-travel range SWO represented in FIG. 5d is repeated for as long as it takes for all sensor values LS1 to be associated with the lower actuating-travel range SWU and all sensor values LS to be associated with the upper actuating-travel range SWO.

Figure 6A:
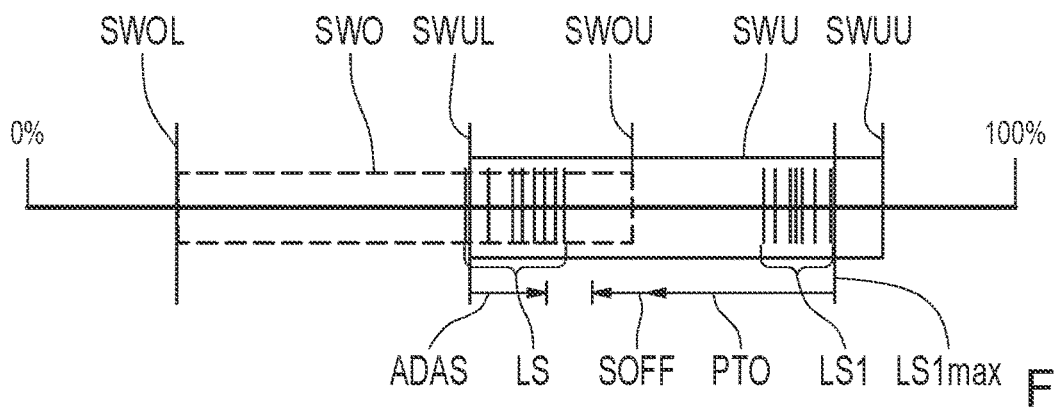
FIG. 6a through FIG. 6d show graphic representations of a further approach as to how actuating-travel ranges for tooth-on-tooth positions of a form-locking shift element according to FIG. 4a are exactly determinable.

FIG. 6a shows a representation corresponding to FIG. 5a. The two predefined actuating-travel ranges SWO and SWU represent the start point for the approach explained in greater detail in the following. Initially, all the sensor values LS determined for certain tooth-on-tooth positions are arranged in the overlap area between the upper actuating-travel range SWO and the lower actuating-travel range SWU. All the sensor values LS1 determined for the tooth-on-tooth positions are located in the lower actuating-travel range SWU.

Figure 6B:
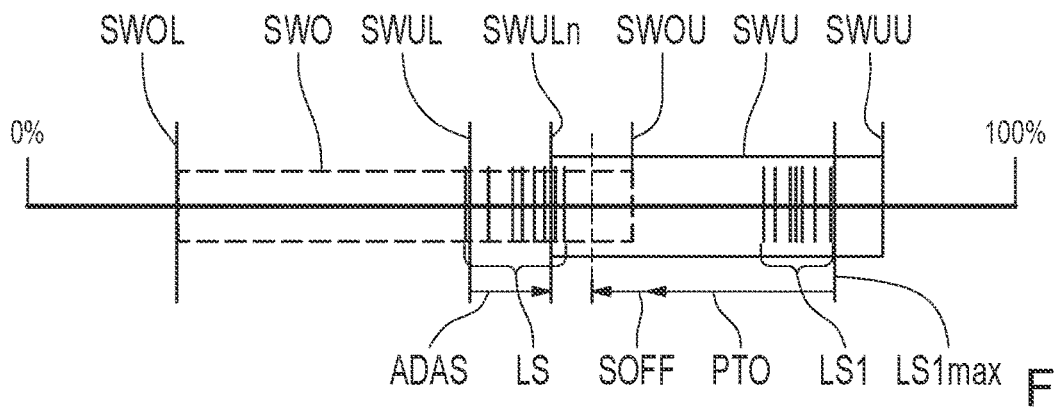
Figure 6C:
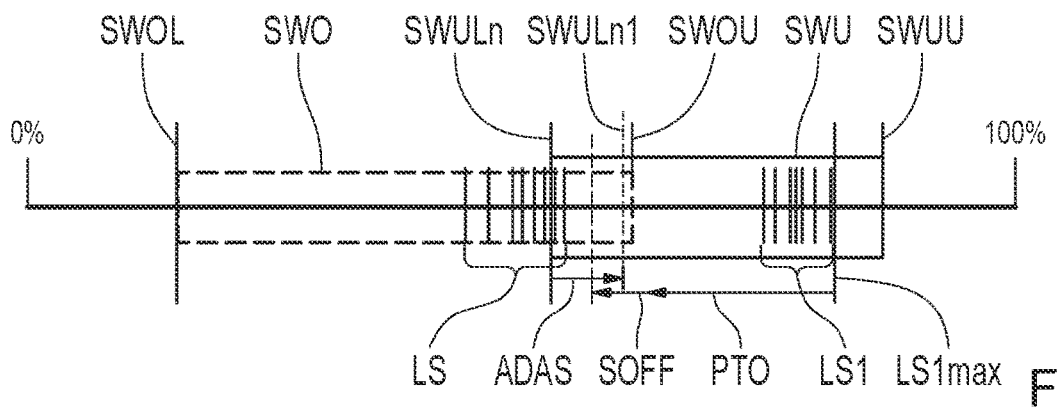
Figure 6D:
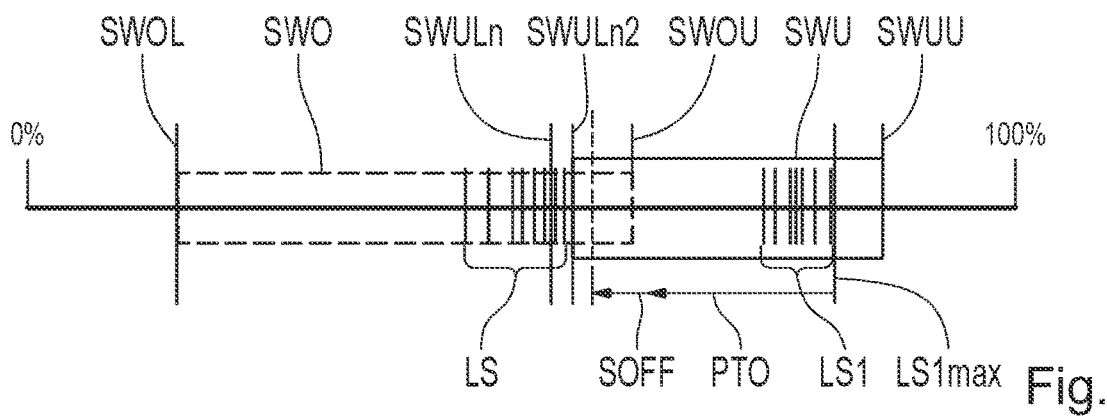

In the presence of such a scenario, the safety actuating-travel range is initially established starting from the highest sensor value LS1max. Thereafter, a check is carried out to determine whether a reduction of the width of the lower actuating-travel range SWU associated with the displacement of the lower limit SWUL by the adaptation value ADAS results in the new lower limit SWULn being located within the safety actuating-travel range. Since this test step yields a negative query result, the width of the lower actuating-travel range SWU is reduced. The new lower actuating-travel range SWU is represented in FIG. 6b.

Since a portion of the sensor values LS is still located in the overlap area between the upper actuating-travel range SWO and the lower actuating-travel range SWU, a check is carried out to determine whether a further reduction of the width of the lower actuating-travel range SWU by the adaptation value ADAS is possible. In the present case, a further reduction of the width of the lower actuating-travel range SWU results in the further new lower limit SWUUn1 of the lower actuating-travel range SWU being located within the safety actuating-travel range. Therefore, a further reduction of the width by the adaptation value ADAS is not carried out.

Thereafter, the axial distance between the new lower limit SWULn of the lower actuating-travel range SWU and the safety actuating-travel range is determined. Thereafter, the new lower limit SWULn is displaced by half the distance and the width of the lower actuating-travel range SWU is reduced by this value. The lower actuating-travel range SWU is now delimited by the lower limit SWULn2, which has been adapted once more, and the upper limit SWUU.

In the present case, all sensor values LS are now associated with the upper actuating-travel range SWO and all sensor values LS1 are associated with the lower actuating-travel range SWU. For this reason, a further adaptation of the actuating-travel ranges SWO and SWU is refrained from for as long as it takes for sensor values that correspond to tooth-on-tooth positions to be located in the overlap area between the upper actuating-travel range SWO and the adapted lower actuating-travel range SWU.

Figure 7A:
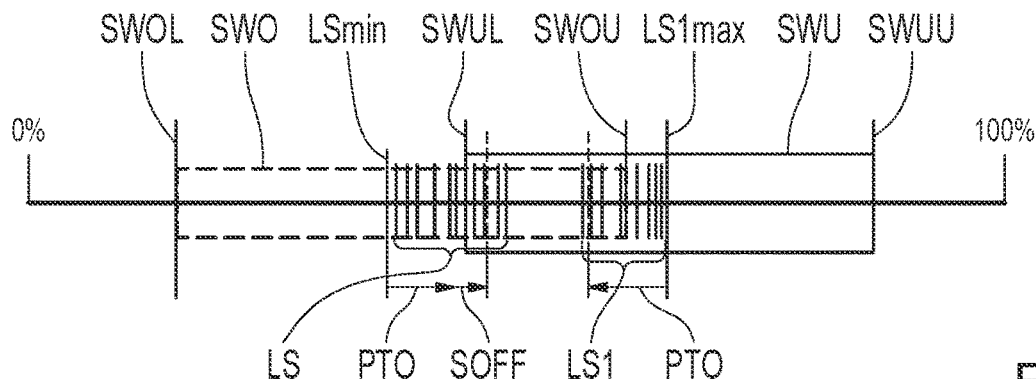
FIG. 7a through FIG. 7f each show a representation corresponding to FIG. 6a through FIG. 6d of a further approach as to how actuating-travel ranges for tooth-on-tooth positions of a shift element according to FIG. 4a are determinable with the desired accuracy.

FIG. 7a shows a representation of the predefined actuating-travel ranges SWO and SWU corresponding to FIG. 5a. A portion of the determined sensor values LS is located only in the upper actuating-travel range SWO and the other portion is located in the overlap area between the upper actuating-travel range SWO and the lower actuating-travel range SWU. Simultaneously, a portion of the sensor values LS1 is located in the lower actuating-travel range SWU and the other portion is located in the overlap area between the two actuating-travel ranges SWO and SWU.

In order to be able to associate the sensor values LS as well as the sensor values LS1 only with the upper actuating-travel range SWO or with the lower actuating-travel range SWU, respectively, a check is initially carried out to determine whether the safety actuating-travel range, starting from the minimum sensor value LSmin, is spaced apart from a further safety actuating-travel range. The further safety actuating-travel range extends, starting from the maximum sensor value LS1max, only across the width of the first actuating-travel range PTO in the direction of the upper actuating-travel range SWO.

In the present case, this query yields a positive result and the center between the minimum sensor value LSmin and the maximum sensor value LS1max is determined. Thereafter, the upper limit SWOU of the upper actuating-travel range SWO is displaced in the direction of the lower limit SWOL and the width of the upper actuating-travel range SWO is reduced. To the same extent, the lower limit SWUL of the lower actuating-travel range SWU is displaced in the direction of the upper limit SWOU of the lower actuating-travel range SWU, and the lower actuating-travel range SWU or its width is reduced. The new upper limit SWOUn of the upper actuating-travel range SWO and the new lower limit SWULn of the lower actuating-travel range SWU coincide to the extent represented in FIG. 7b.

The two new limits SWULn and SWOUn are spaced apart in the direction of the upper limit SWUO of the lower actuating-travel range SWU by a safety offset value SOFF from the center between the minimum sensor value LSmin and the maximum sensor value LS1max. Therefore, incorrect assignments of further determined tooth-on-tooth positions are avoidable in a simple way.

Figure 7B:
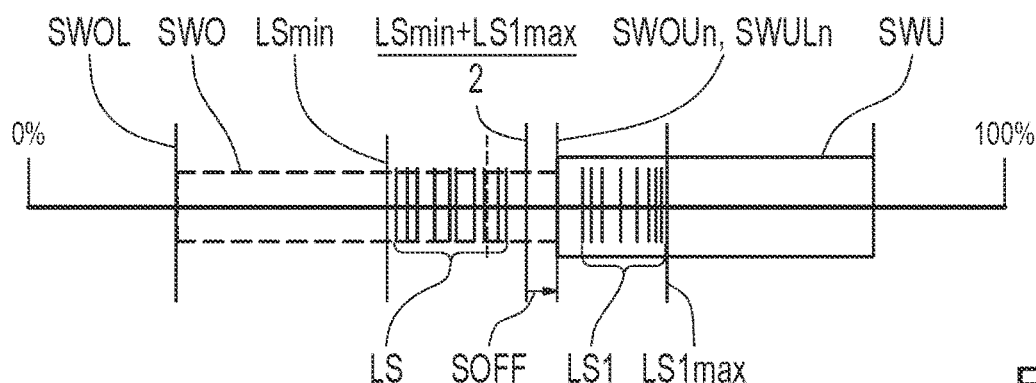
Figure 7C:
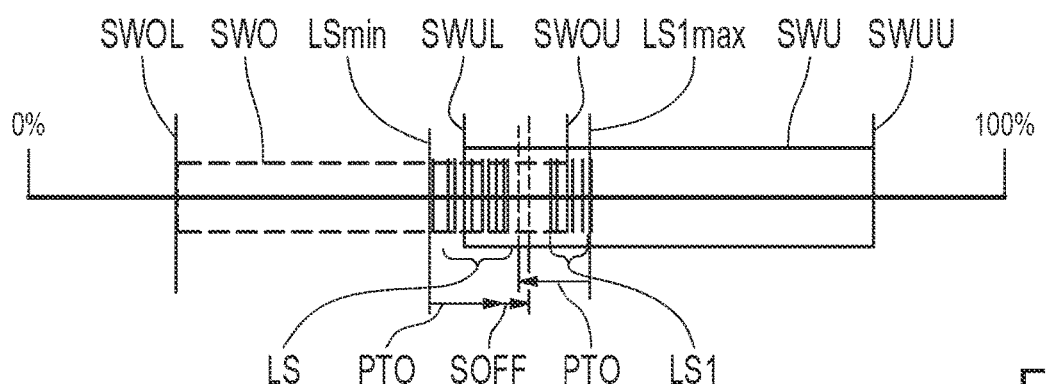

FIG. 7c shows a further scenario, in which the distance between the minimum sensor value LSmin and the maximum sensor value LS1max is substantially less than in the scenario on which the representation according to FIG. 7a is based. The distance between the minimum sensor value LSmin and the maximum sensor value LS1max is such that the safety actuating-travel range and the further safety actuating-travel range overlap. For this reason, the approach described with respect to FIG. 7a and FIG. 7b is not applicable in the scenario on which the representation according to FIG. 7c is based, in order to avoid, by an adaptation, incorrect assignments of tooth-on-tooth positions of the shift element A or F according to FIG. 4a.

Figure 7D:
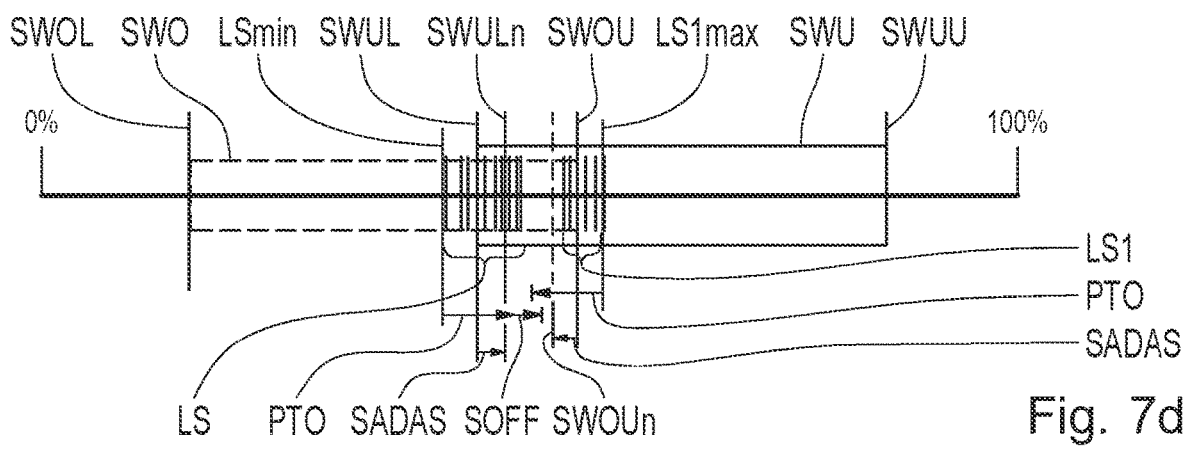
Figure 7E:
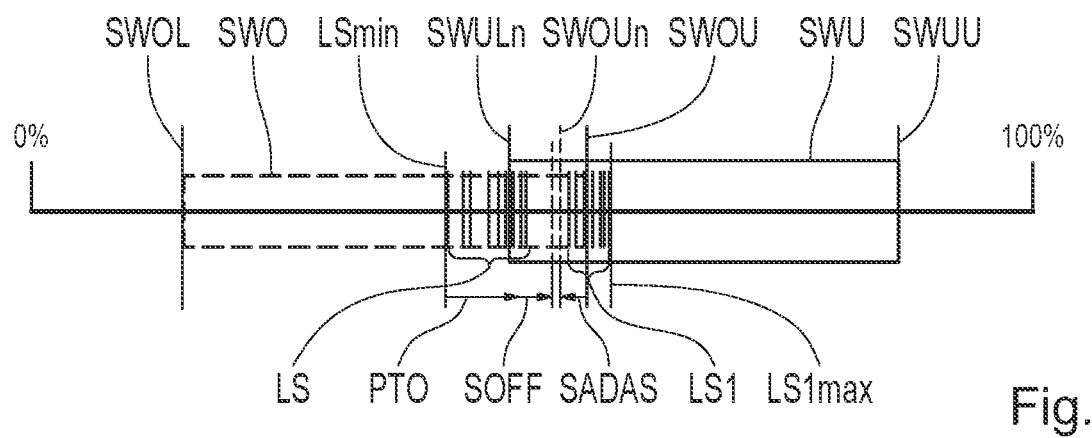

For this reason, the lower limit SWUL of the lower actuating-travel range SWU is initially raised by a small adaptation step SADAS and the width of the lower actuating-travel range SWU is reduced. The adapted lower actuating-travel range SWU is shown in FIG. 7d.

Figure 7F:
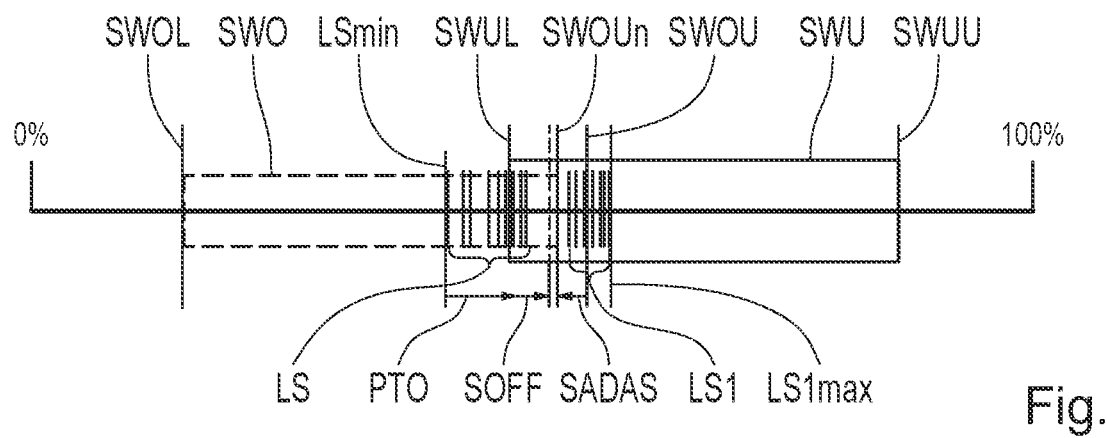

Thereafter, a check is carried out to determine whether a displacement of the upper limit SWOU of the upper actuating-travel range SWO by the small adaptation step SADAS in the direction of the lower limit SWOL results in the new upper limit SWOUn being located within the safety actuating-travel range. Since this check yields a negative query result, the upper limit SWOU is reduced by the small adaptation step SADAS. This adaptation step results in all sensor values LS1 being associated with the lower actuating-travel range SWU. The upper actuating-travel range SWO reduced to the above-described extent is represented in FIG. 7f.

Thereafter, the approach described with respect to FIG. 6a through FIG. 6d is carried out for as long as it takes for all sensor values LS to be associated only with the upper actuating-travel range SWO.

Figure 8A:
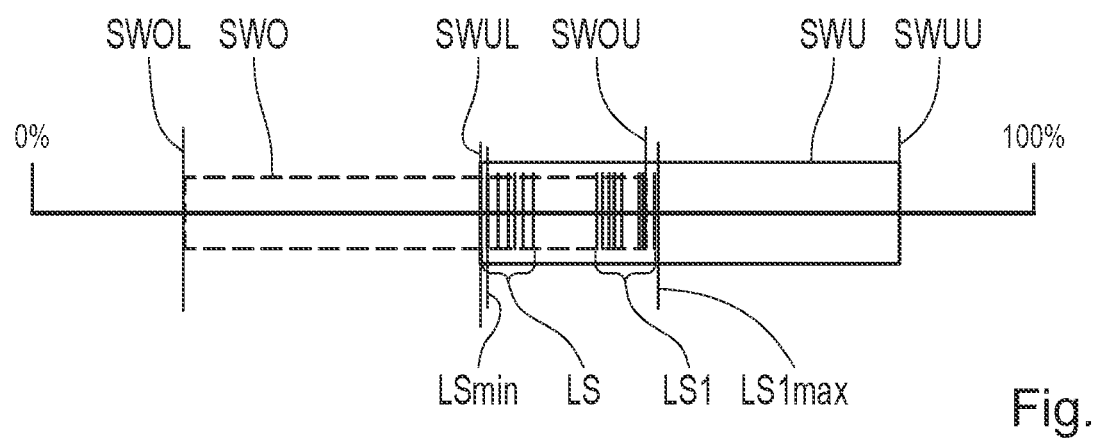
Figure 8B:
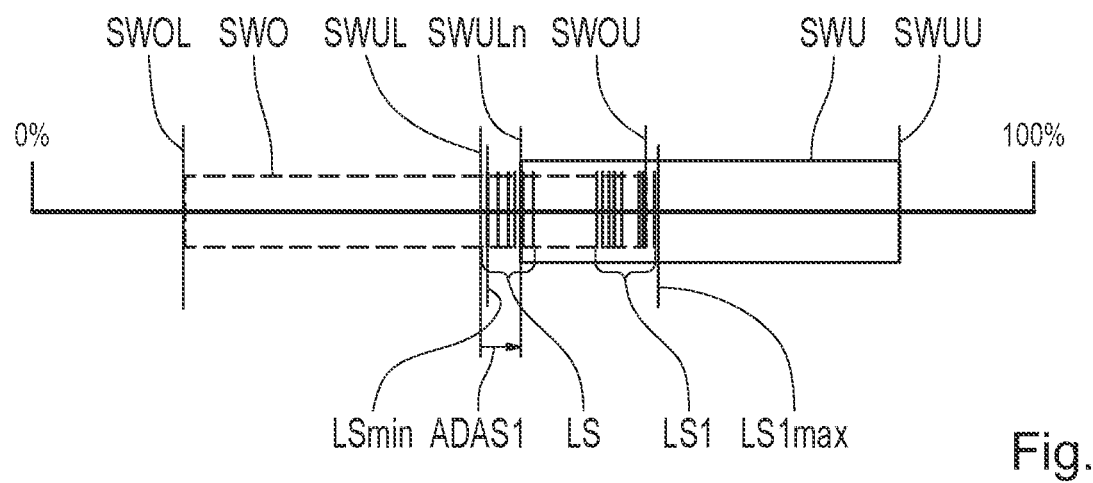

FIG. 8a shows a representation of the predefined actuating-travel ranges SWO and SWU corresponding to FIG. 5a. In the scenario used as the basis for FIG. 8a, all determined sensor values LS and LS1 are located in the overlap area between the two predefined actuating-travel ranges SWO and SWU. Starting from this scenario, the lower limit SWUL of the lower actuating-travel range SWU is displaced by the extent represented in FIG. 8b by a further adaptation step ADAS1 in the direction of the upper limit SWUU and, thereby, the width of the lower actuating-travel range SWU is reduced. Due to this measure, a portion of the sensor values LS is now located only in the upper actuating-travel range SWO, while the other portion of the sensor values LS, as well as the sensor values LS1, is/are located in the overlap area.

Thereafter, the adaptation is carried out further to the extent described with respect to FIG. 5a through 5d, in order to be able to unambiguously assign the sensor values LS and LS1 to the upper actuating-travel range SWO or to the lower actuating-travel range SWU, respectively.

Additionally, an advantageous variant of a learning routine is described in the following. By the learning routine, reference values corresponding to the end positions of the shift-element halves 10 and 11 shown in FIG. 3a and FIG. 3e, and in FIG. 4a and FIG. 4f, respectively, are determinable by sensors associated with the form-locking shift elements A and F. The learning routine is initially carried out, starting from a completely disengaged operating condition of the form-locking shift element A or F, in the direction of the completely engaged operating condition of the form-locking shift element A or F. During this operating condition change of the form-locking shift element A or F, the end positions of the shift-element halves 10 and 11 corresponding to the engaged operating condition of the form-locking shift element A or F are determined. Thereafter, the learning routine is carried out for the operating condition change of the form-locking shift element A or F starting from the completely engaged operating condition in the direction of the completely disengaged operating condition. During this operating condition change of the form-locking shift element A or F, the end positions of the shift-element halves 10 and 11 are determined that correspond to the completely disengaged operating condition of the form-locking shift element A or F.

In the example embodiment of the form-locking shift elements A and F, in which only one of the two shift-element halves 10 or 11 is designed to be displaceable in the axial direction with respect to the other shift-element half 11 or 10, only the axial actuating movement of the movable shift-element half 10 or 11 is monitored by the particular associated sensor. If both shift-element halves 10 and 11 are designed to be movable with respect to each other in the axial direction, however, the actuating movements of the shift-element halves 10 and 11 are monitored by the associated sensor. The end positions of the shift-element halves 10 and 11 can be determined via the learning routine regardless of which end positions of the shift-element halves 10 and 11 are determined first.

During the determination of the reference values of the sensor, which, in the completely engaged operating condition of the form-locking shift element A or F, correspond to the end positions of the shift-element halves 10 and 11, the differential speed between the shift-element halves 10 and 11 at the instant of engagement is guided to values within the differential speed range necessary therefor. Thereupon, the differential speed between the shift-element halves 10 and 11 has values close to the synchronous speed of the form-locking shift element A or F. This measure ensures, on the one hand, that the form-locking shift element A or F can be reliably engaged and, on the other hand, that a rattling operation and, thereby, damage of the form-locking shift element A or F is avoided.

In the transmission 3 considered in the present case, the differential speed between the shift-element halves 10 and 11 of the form-locking shift elements A and F is implemented by an appropriate actuation of the friction-locking shift elements B through E.

Since there is the possibility of a tooth-on-tooth position and/or a flank clamping during the demanded engagement process of the form-locking shift element A or F, the form-locking shift element A or F is actuated in the way described in greater detail in the following. Countermeasures against potential tooth-on-tooth positions and against a potential flank clamping are implemented in this case. This is necessary, since the actuating movement of the shift-element half 10 or 11 or of both shift-element halves 10 and 11 in the engagement direction is zero during a tooth-on-tooth position as well as during a flank clamping. Thereupon, it is possible that the particular current position of the shift-element half 10 and/or 11 is erroneously considered by the sensor to be the position that corresponds to the completely engaged operating condition of the form-locking shift element A or F.

For this reason, the torque applied at the form-locking shift element A or F during the engagement process is increased before the meshing of the shift-element halves 10 and 11, i.e., before an overlap forms between the dog elements 10A and 11A or 10A1 and 11A1, and, additionally, the axial engagement force is reduced, in order to release or avoid a potential tooth-on-tooth position.

Thereafter, the torque applied at the form-locking shift element A or F is reduced and the axial actuating force applied at the shift element A or F in the engagement direction is increased if it is assumed that the shift-element halves 10 and 11 are in partial overlap with each other. Due to this approach, a potential flank clamping between the shift-element halves 10 and 11 is released or avoided.

The above-described measures ensure that the shift-element halves 10 and 11 of the form-locking shift element A or F reach the end positions corresponding to the completely engaged operating condition of the form-locking shift element A or F and the reference values of the sensor corresponding thereto are determined.

In order to determine the end positions of the shift-element halves 10 and 11 corresponding to the completely disengaged operating condition of the form-locking shift element A or F, the learning routine is carried out, starting from a completely engaged operating condition of the form-locking shift element A or F, to the extent described in greater detail in the following.

For this purpose, the completely engaged form-locking shift element A or F is initially actuated or activated in the disengagement direction with the maximum possible actuating force. Simultaneously, the torque applied at the form-locking shift element A or F is reduced to the greatest possible extent. The reduction of the torque applied at the form-locking shift element A or F can take place, for example, by disengaging all shift elements B through E and A or F. In such an operating condition of the transmission 3, the power flow in the transmission 3 between the transmission input shaft 5 and the transmission output shaft 6 is interrupted and, thereby, the torque applied at the form-locking shift element A or F is minimal. By this approach, it is very likely ensured that the form-locking shift element A or F is transferred into its completely disengaged operating condition and the sensor faultlessly determines the end positions of the shift elements 10 and 11.

The particular determined reference values, which correspond to the disengaged operating condition and to the engaged operating condition of the form-locking shift element A or F, are stored for the interim in a memory provided for this purpose.

In order to avoid a faulty determination of these end positions of the shift-element halves 10 and 11, it can be provided that the learning routine is carried out several times in succession. The particular determined end positions of the shift-element halves 10 and 11 of the form-locking shift elements A and F are compared to one another. If the particular determined reference values of the sensors deviate only slightly from one another, it is assumed that a determination of the reference values is sufficiently accurate. Thereafter, the reference values are stored in a non-volatile memory of a control unit, preferably of the transmission control unit.

If the determined reference values, which correspond to the disengaged operating condition and to the engaged operating condition of the form-locking shift element A or F, have been determined one time, the operating range of the form-locking shift element A or F is additionally subdivided into temperature and pressure classes. Thereafter, a reference value or a position value of the end position is determined every time a dog end position is reached, which corresponds either to the disengaged operating condition or to the engaged operating condition of the form-locking shift element A or F. This redetermined position value of the end position of the movable shift-element half 10 is compared to the previously determined position value of the end position, which is associated with the temperature and pressure class, for which the new position value was determined. If the currently determined position value is greater than the previously determined position value, the position value of the current temperature and pressure class is increased by a defined value. If the currently determined position value is less than the previously determined position value, the position value of the currently considered temperature and pressure class is decreased by a defined value.

The particular adapted value is stored for the current temperature and pressure class and is utilized as a reference value for further adaptation steps.

If a certain predefined number of adaptations was carried out for a temperature and pressure class, the parameterizable value or the predefined increment is reduced, by which the previously determined position value is increased or decreased. As a result, it is achieved, in a simple way, that the adaptation is carried out in a less precise and faster manner at the beginning and, as the operating time increases, deviations between two adaptation steps are taken into account to a lesser extent. Therefore, faulty sensor signals have substantially less influence on a system that has already been fully adapted.

The adaptation values determined to the latter-described extent are first added to or subtracted from the initially learned end positions of the shift-element half 10, as an offset, if a parameterizable number of adaptations was carried out for both end positions of the shift-element half 10. In this way, it is ensured that the adaptations depict the physical end positions of the shift-element half 10 as precisely as possible, before they are utilized for end position detection.

Alternatively or additionally, it is also possible to carry out the adaptation of the position values of the end positions of the shift-element half 10 as a function of defined driving situations. These types of driving situations represent, for example, a coasting mode or a traction mode of the vehicle drive train 1. Moreover, the adaptation is also implementable while a vehicle is stationary or when a ratio has been selected for travel in reverse "R".

As the sensor maturity increases, the temperature-dependent classes can also be replaced by a characteristic curve, the slope and support point of which are adapted by the adaptation.

Figure 9:
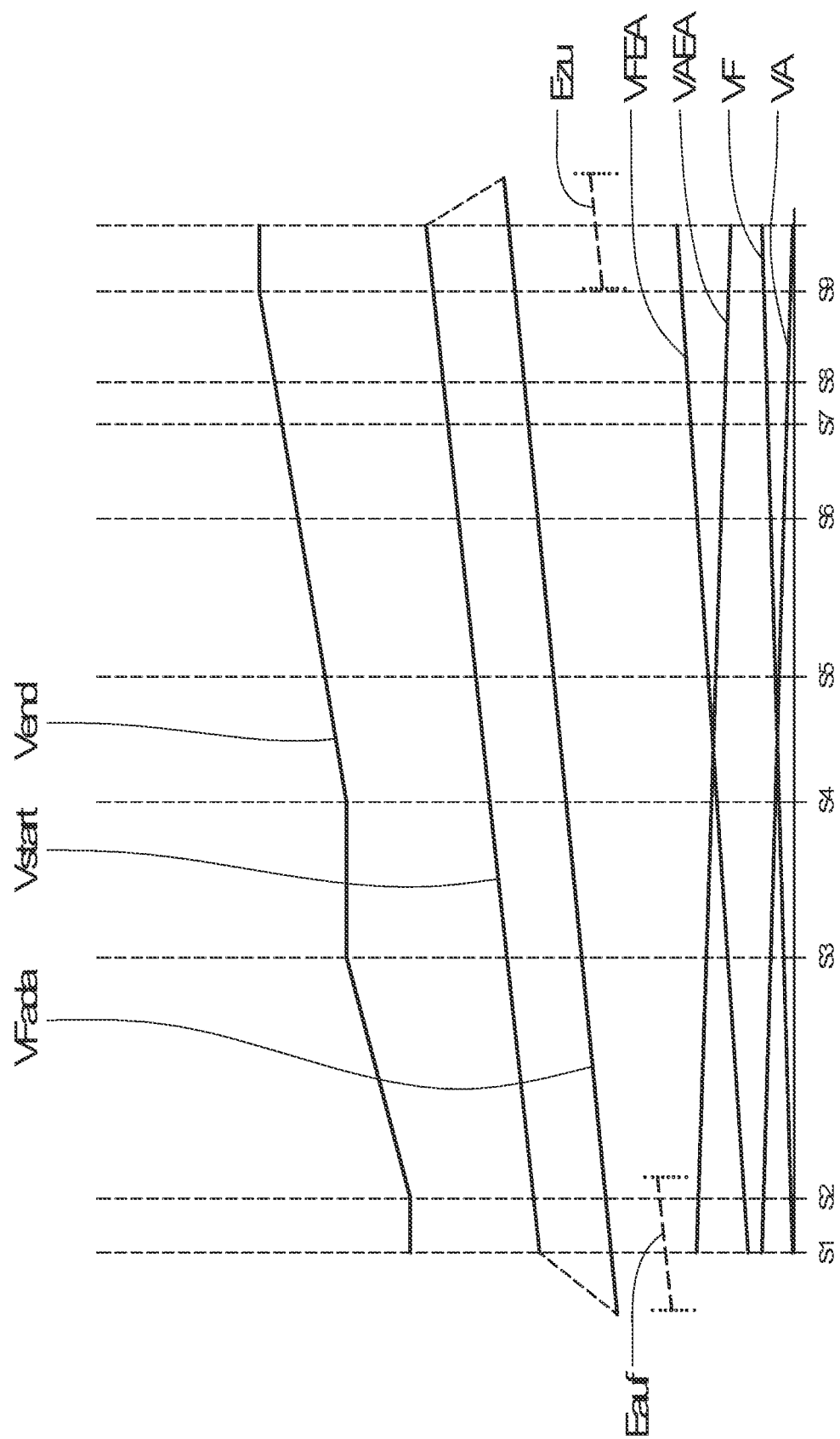
FIG. 9 shows multiple progressions of a signal of a sensor, by which an actuating-travel position of a shift-element half of a form-locking shift element according to FIG. 3a and/

FIG. 9 shows multiple progressions of the signal of the sensor, which is associated with the form-locking shift element A or F. The progressions VA and VF each correspond to the raw signal of the sensor, which is associated with the form-locking shift element A or F, respectively. By the sensors, the current position of the shift-element half 10 with respect to the shift-element half 11 during a disengagement process or during an engagement process is determinable across its entire actuating travel. The progressions of the signal VA and VF are each represented in an idealized manner as straight lines. The slopes of the progressions VF and VA have different signs. This is due to the fact that the shift elements A and F are installed in the transmission 3 with different orientations.

The further progressions VFEA and VAEA represented above the signal progressions VF and VA are the progressions that are present, starting from the signal progressions VF and VA, after the above-described end position determination has been carried out.

Based thereon, the adaptation of the end positions takes place by subdividing the operating range of the form-locking shift element A or F into pressure and temperature classes, which is also described above in greater detail. The two actuating-travel ranges Eauf and Ezu shown in FIG. 9 result from the end position adaptation. The ranges Eauf and Ezu each extend beyond the entire actuating-travel range of the form-locking shift element A or F, in order to be able to take the pressure- and temperature-induced scatterings into account in the determination of the current actuating-travel position of the shift element half to a suitable extent.

Above the two actuating-travel ranges Eauf and Ezu, a progression VFada is shown in FIG. 9, which represents a combination of the progression VFEA and the two ranges Eauf and Ezu.

The progression Vstart shown above the progression VFada corresponds to a progression of the signal of the sensor, on which the tooth-on-tooth adaptation is based. On the basis of the progression Vstart, the above-described determination of the actuating travel is carried out, within which a tooth-on-tooth position is likely. After the determination of the tooth-on-tooth range for the shift element A or F according to FIG. 3a or of the tooth-on-tooth ranges for the shift element A or F according to FIG. 4a has been carried out, the linear progression Vstart is subdivided into different actuating-travel ranges on the basis of the information gathered regarding the various adaptations and learning routines. The progression having this information corresponds to the progression Vend, the ranges of which are described in greater detail in the following.

In the present case, a completely disengaged operating condition of the form-locking shift element A or F is assumed between a first actuating-travel value S1 and a second actuating-travel value S2 of the progression Vend. This operating condition therefore corresponds to the first end position of the shift-element half 10. Starting at the actuating-travel value S2, the progression Vend increases up to a third actuating-travel value S3, which defines the beginning of the tooth-on-tooth range between the shift-element halves 10 and 11. Here, tooth-on-tooth positions are possible between the dog elements 10A and 11A of the shift element A or F according to FIG. 3a. Additionally, tooth-on-tooth positions between the longer dog elements 10A1 and 11A1 of the shift-element halves 10 and 11 of the form-locking shift element A or F according to FIG. 4a are also possible here.

The tooth-on-tooth range extends from the actuating-travel value S3 to the further actuating-travel value S4. Starting at the actuating-travel value S4, as the actuating-travel value continues to increase, it is assumed that a partial overlap exists between the two shift-element halves 10 and 11 of the form-locking shift element A or F.

An actuating-travel value S5 defines a lower limit of the further tooth-on-tooth range of the form-locking shift element A or F according to FIG. 4a, within which a tooth-on-tooth position is possible between the longer dog elements 10A1 and 11A1 and the shorter dog elements 11A2 and 10A2 of the shift-element halves 10 and 11. Additionally, a further actuating-travel value S6 defines the upper limit of this tooth-on-tooth range.

A further actuating-travel range is defined between an actuating-travel value S7, which is greater than the actuating-travel value S6 in the application presently under consideration, and a further, greater actuating-travel value S8. Within this actuating-travel range, the form-locking shift element A or F has a partial overlap such that a particular torque applied at the form-locking shift element A or F is fully transmissible via the shift element A or F without adversely affecting the fatigue strength of the form-locking shift element A or F. With this knowledge, partially overlapped driving is possible, without the need to transfer the shift element A or F into its completely engaged operating condition by escalation measures, due to which ride comfort is adversely affected. Above an actuating-travel value S9, the completely engaged operating condition of the form-locking shift element A or F is detected and it is assumed that the movable shift-element half 10 is in the second end position.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 vehicle drive train
2 prime mover
3 transmission
4 drive output
5 transmission input shaft
6 transmission output shaft
7 torsion damper
8 hydrodynamic torque converter
9 torque converter lockup clutch
10, 11 shift-element half
10A, 10A1, 10A2 dog element
11A, 11A1, 11A2 dog element
10B, 1061, 1062 end face of the dog element
10C flank of the dog element
11B, 1161, 1162 end face of the dog element
11C flank of the dog element
"1" to "9" transmission ratio for forward driving
"R" transmission ratio for travel in reverse
A to F shift element
ADAS adaptation step
ADAS1 further adaptation step
Eauf, Ezu actuating-travel range
LS, LS1 sensor values
LS1max maximum sensor value
LSmin minimum sensor value
P1 to P4 planetary gear set
PTO first actuating-travel range
S1 to S9 discrete actuating-travel value
SADAS small adaptation step
SOFF safety range
SWO upper actuating-travel range
SWOL, SWOU limits of the upper actuating-travel range
SWU lower actuating-travel range
SWUL, SWUU limits of the lower actuating-travel range
VF, VA, VFEA,
VAEA, VFada,
Vstart, Vend progression of the signal of the sensor

The invention claimed is:

1. A method for determining an actuating-travel range between two shift-element halves (10, 11) of a form-locking shift element (A, F), the two shift-element halves (10, 11) bringable into engagement or out of engagement with each other in a form-locking manner by moving at least one of the shift-element halves (10) with respect to the other shift-element half (11), the method comprising:

during an engagement of the form-locking shift element (A, F) and with a tooth-on-tooth position between the two shift-element halves (10, 11), monitoring an actuating movement of the at least one movable shift-element half (10) with respect to the other shift-element half (11) with a sensor; and detecting the tooth-on-tooth position when
the actuating movement of the at least one movable shift-element half (10) in the engagement direction measured by the sensor within an actuating-travel range of the at least one movable shift-element half (10) between a disengaged condition and an engaged condition of the shift element (A, F) is zero,
a ratio between an engagement force applied at the shift element (A, F) and a radial force acting on the shift-element halves (10, 11) is within a value range facilitating the tooth-on-tooth position, the radial force resulting from a torque applied at the shift element (A, F), and
the sensor detects the actuating movement of the at least one movable shift-element half (10) in the engagement direction after a reduction of the engagement force, after an increase of the torque applied at the shift element (A, F), or after both the reduction of the engagement force and the increase of the torque applied at the shift element (A, F).

2. The method of claim 1, wherein the determination of the actuating-travel range between the shift-element halves (10, 11) starts when:

the actuating movement of the at least one movable shift-element half (10) in the engagement direction equal to zero is detected by the sensor; and
a signal of the sensor within a time period, which is equal to a predefined time period or is longer than the predefined time period, is greater than or equal to a predefined lower threshold value and less than or equal to a predefined upper threshold value.

3. The method of claim 1, wherein, when the detection of the tooth-on-tooth position is carried out for the first time and upon determination of the actuating-travel range between the shift-element halves (10, 11) corresponding thereto, the minimum value of the signal of the sensor and the maximum value of the signal of the sensor form limits of the actuating-travel range between the shift-element halves (10, 11) within which the tooth-on-tooth position is expected.

4. The method of claim 3, further comprising changing the limits of the actuating-travel range as a function of further values of the signal of the sensor, each of the further values of the signal of the sensor determined for a respective tooth-on-tooth position during subsequent determinations of the actuating-travel range between the shift-element halves (10, 11), when the further values of the signal of the sensor deviate from the previously determined values of the signal of the sensor by more than an absolute value of a threshold value in each case.

5. The method of claim 3, further comprising varying the limits of the value range as a function of the particular currently determined values of the signal of the sensor when a difference between the value range defined by the currently determined values of the signal of the sensor and the value range that was previously determined is less than or equal to a predefined threshold value.

6. The method of claim 3, further comprising discarding the limits of the previously determined actuating-travel range and redetermining the actuating-travel range during a subsequent determination of the tooth-on-tooth position when a difference between the actuating-travel range defined by the currently determined values of the signal of the sensor and the previously determined actuating-travel range is greater than a predefined threshold value and the previously determined actuating-travel range was established as a function of a number of detected tooth-on-tooth positions that is less than a threshold value.

7. The method of claim 3, further comprising increasing the actuating-travel range by varying the limits as a function of the determined values of the signal of the sensor until a difference between the limits of the actuating-travel range is greater than or equal to a predefined maximum value.

8. The method of claim 3, wherein:

the minimum and maximum values of the signal of the sensor are determined for each tooth-on-tooth position and are compared to the respective limits of an actuating-travel range that was previously determined as a function of a number of ascertained tooth-on-tooth positions greater than a threshold value; and
the limits of the actuating-travel range are increased or decreased by an offset when the determined minimum value and the determined maximum value of the signal of the sensor deviate from the lower limit or from the upper limit, respectively, of the actuating-travel range by values greater than an absolute value of a threshold value.

9. The method of claim 8, further comprising:

varying each of the limits of the actuating-travel range as a function of the minimum or maximum values of the signal of the sensor determined for the tooth-on-tooth position when the difference between the limits of the actuating-travel range reaches or exceeds the maximum value and the minimum value or the maximum value of the signal of the sensor is outside the actuating-travel range; and
adapting each of the limits of the actuating-travel range, in a mutually coordinated manner, such that the difference between the limits of the adapted actuating-travel range does not substantially exceed the maximum distance.

10. The method of claim 1, further comprising, starting from two predefined actuating-travel ranges (SWO, SWU) between the shift-element halves (10, 11) that overlap, determining two actuating-travel ranges, wherein each of the shift-element halves (10, 11) includes two groups of dog elements (10A1, 10A2, 11A1, 11A2), wherein the dog element (10A1, 11A1) of the first group has a longer length in the actuation direction of the at least one movable shift-element half (10) than the dog element (10A2, 11A2) of the second group, and wherein the dog elements (10A1, 10A2, 11A1, 11A2) of the two groups are arranged next to one another in alternation in a circumferential direction of the shift-element halves (10, 11).

11. The method of claim 10, further comprising adapting the limits (SWOU, SWUL) of the actuating-travel ranges (SWO, SWU) until all values of the signal of the sensor, which are determined for the tooth-on-tooth positions and lie within the overlap area of the two actuating-travel ranges (SWO, SWU), are assigned to only one of the two actuating-travel ranges (SWO or SWU).

12. The method of claim 10, wherein the actuating-travel range (SWO) that represents a value range for signals of the sensor, which are determined for tooth-on-tooth positions between the dog elements (10A1, 11A1) of the first group of the shift-element halves (10, 11), has a minimum width such that distances between the particular minimum values determined for a tooth-on-tooth position and maximum values of the signal of the sensor resulting from movements of the shift element (A, F) with respect to the sensor and from a tolerance-related sensor behavior are encompassed by the actuating-travel range (SWO).

13. A control unit configured to implement the method of claim 1 on a control side.

14. A computer program product, comprising program code stored on a computer-readable data carrier in order to implement the method of claim 1 when the program code is run on a computing device or on a processing unit.

15. A control unit for determining a tooth-on-tooth position between two shift-element halves (10, 11) of a form-locking shift element (A, F), the two shift-element halves (10, 11) bringable into engagement with each other in a form-locking manner during an engagement of the form-locking shift element (A, F), the control unit configured for:

monitoring a relative movement between the shift-element halves (10, 11) in an engagement direction with a sensor during an engagement process; and detecting a tooth-on-tooth position when
  the relative movement between the shift-element halves (10, 11) in the engagement direction measured by the sensor is zero within an actuating-travel range between the shift-element halves (10, 11) between a disengaged condition and an engaged condition of the shift element (A, F),
  a ratio between an engagement force applied at the shift element (A, F) and a radial force acting on the shift-element halves (10, 11), which results from a torque applied at the shift element (A, F), is within a value range facilitating the tooth-on-tooth position, and
  an actuating movement of the at least one movable shift-element half (10) in the engagement direction is detected by the sensor after a reduction of the engagement force, after an increase of the applied torque, or after both the reduction of the engagement force and the increase of the applied torque.

* * * * *